United States Patent [19]

Haghighi et al.

[11] Patent Number: 5,539,664
[45] Date of Patent: Jul. 23, 1996

[54] PROCESS, APPARATUS, AND SYSTEM FOR TWO-DIMENSIONAL CACHING TO PERFORM MOTION ESTIMATION IN VIDEO PROCESSING

[75] Inventors: Siamack Haghighi, Tempe; Brian Astle, Phoenix, both of Ariz.

[73] Assignee: Intel Corporation, Santa Clara, Calif.

[21] Appl. No.: 262,668

[22] Filed: Jun. 20, 1994

[51] Int. Cl.[6] .................................................. G06F 17/00
[52] U.S. Cl. ............................................... 364/514 R
[58] Field of Search ........................... 364/514 R, 514 A; 348/390, 396, 391, 394, 395, 404, 409, 412, 13, 15, 19, 607; 395/162, 425; 345/135

[56] References Cited

U.S. PATENT DOCUMENTS

| | | | |
|---|---|---|---|
| 4,491,836 | 1/1985 | Collmeyer et al. ..................... | 345/135 |
| 5,185,819 | 2/1993 | Ng et al. ................................ | 348/409 |
| 5,212,742 | 5/1993 | Normile et al. ........................ | 348/409 |
| 5,379,393 | 1/1995 | Yang ....................................... | 395/425 |

*Primary Examiner*—Ellis B. Ramirez
*Attorney, Agent, or Firm*—Steve Mendelsohn; William H. Murray

[57] ABSTRACT

A subset of signals corresponding to a two-dimensional set of signals is stored into an area of computer memory smaller than the two-dimensional set for processing. Additional signals are sequentially stored in the computer memory area and processed until the entire set of signals has been processed. In a preferred embodiment, motion estimation processing is performed by sequentially transmitting video signals corresponding to portions of a search region of a previous frame from off-chip memory and storing the video signals to on-chip memory for comparison with a reference block of a current frame. The invention provides reduced computer memory usage, reduced signal transfer, and more uniform signal transfer in computer-implemented processing, such as motion estimation processing, that involves two-dimensional caching.

35 Claims, 32 Drawing Sheets

FIGURE 6a.
COLUMN

FIGURE 6b.
COLUMN

FIGURE 6m.
COLUMN

FIGURE 6n.
COLUMN

FIGURE 6o.
COLUMN

FIGURE 6p.
COLUMN

FIGURE 6u.
COLUMN

FIGURE 6v.
COLUMN

FIGURE 6w.
COLUMN

FIGURE 6x.
COLUMN

FIGURE 10.

COLUMN

FIGURE 11.

COLUMN

FIGURE 12.

COLUMN

FIGURE 13.

COLUMN

PROCESS, APPARATUS, AND SYSTEM FOR TWO-DIMENSIONAL CACHING TO PERFORM MOTION ESTIMATION IN VIDEO PROCESSING

BACKGROUND OF THE INVENTION

1. Field of the Invention

The present invention relates to two-dimensional caching in computer memory devices, and, in particular, to processes, apparatuses, and systems for using two-dimensional caching to perform motion estimation in video processing.

2. Description of the Related Art

In video processing, motion estimation is often employed to exploit the temporal redundancy in sequential frames of video signals. Motion estimation determines the location of portions of one video frame that correspond to similar portions of another video frame. Motion estimation is used in video encoding to reduce the number of bits used to represent the video signals for efficient storage and/or transmission.

Referring now to FIG. 1, there is shown a current frame 10 and a previous frame 12 for a conventional motion estimation scheme. In conventional motion estimation, the video signals of the current frame 10 are compared to the video signals of the previous frame 12 to determine the location of portions of the previous frame that correspond to portions of the current frame. For purposes of this application, video signals represent, for example, the amplitudes of video images at particular locations and, in that case, are equivalent to pixel values. The current frame is divided into reference blocks such as reference block 14. The video signals of each reference block are then compared to the video signals of a corresponding, but larger, search region of the previous frame 12 to determine the block of the previous frame 12 that most closely matches the reference block of the current frame 10, using selected comparison criteria. For example, the video signals of reference block 14 of the current frame 10 may be compared to the video signals of search region 16 of the previous frame 12.

Referring now to FIGS. 2 and 3, there are shown graphical representations reference block 14 of current frame 10 of FIG. 1 and the corresponding search region 16 of previous frame 12 of FIG. 1, respectively. As shown in FIGS. 1 and 2, the upper left corner of reference block 14 is located at pixel (i,j) of current frame 10. Reference block 14 has a height of h rows and width of w columns.

Typical motion estimation schemes such as the H.261 (P×64) and ISO/IEC 11172-2 (MPEG) standards set limits on the maximum vertical distance $d_i$ and maximum horizontal distance $d_j$ between a reference block of the current frame and the "most closely matching" block of the previous frame. Thus, the upper left corner $(i-d_i, j-d_j)$ of search region 16 of FIG. 3 corresponds to the maximum motion in the negative vertical (i.e., up) and negative horizontal (i.e., left) directions. Similarly, the lower right corner $(i+h+d_i, j+w+d_j)$ of search region 16 corresponds to the maximum motion in the positive vertical (i.e., down) and positive horizontal (i.e., right) directions. With these limits on maximum vertical and horizontal distances, search region 16 contains all of the possible locations of the block of the previous frame 12 that most closely matches the reference block 14 of the current frame 10.

For example, the maximum horizontal and vertical distances between a reference block and the corresponding subregion may be eight pixels. If the current frame is divided into (16×16) reference blocks, then each (16×16) reference block is compared to a (32×32) search region of the previous frame, where the location of the center of the reference block corresponds to the location of the center of the search region, as shown in FIG. 1. Those skilled in the art will understand that reference blocks near the frame edges are typically compared to search regions that are smaller than (32×32) pixels.

In an exhaustive motion estimation search, (16×16) reference block 14 is compared to each of the $17^2$ or 289 different (16×16) blocks of search region 16 to determine the block in search region 16 that best matches the reference block. For image encoding, a motion vector corresponding to the distance between the reference block of the current frame and the "best match" search block of the previous frame may then be used to encode the reference block of the current frame.

One conventional way to implement the exhaustive motion estimation search is to load the video signals corresponding to the (16×16) reference block into a first area (i.e., reference area) of computer memory and the video signals corresponding to the entire (32×32) search region into a second area (i.e., search area) of the computer memory. The video signals in the reference area are then compared to the 289 different sets of (16×16) video signals in the search area, one set at a time. The sequence of comparisons may, for example, follow a raster scan pattern (i.e., moving from left to right along rows and from top to bottom along columns of the search area).

For 8-bit video signals, such a search mechanism requires (16×16) or 256 bytes for the reference area of the computer memory to hold the reference block and (32×32) or 1024 bytes for the search area of the computer memory to hold the entire search region. When the motion estimation search is complete for that reference block and that search region, the video signals for the next (16×16) reference block are loaded into the reference area and the video signals for the corresponding (32×32) search area are loaded into the search area. Those skilled in the art will understand that such motion estimation processing uses two-dimensional caching (i.e., accessing two-dimensional blocks of signals for processing).

In order to perform motion estimation efficiently, it is desirable to reduce the size of the areas of computer memory used. This is especially true where the computer memory is on-chip memory, although it may also apply when an external memory device is used. In addition, it is desirable to reduce the amount of signal transfer into the computer memory during the motion estimation processing. It is also desirable to spread the signal transfer over the processing sequence to provide more uniform signal transfer. These two factors (i.e., limited on-chip memory and limited I/O bandwidth) limit the range of motion estimation that can be processed in real time with a given hardware design.

To increase the motion estimation range with a given processor complexity (i.e., with a given transistor budget), what is needed is a motion estimation scheme that reduces the memory usage, reduces the signal transfer rate, and uses a more uniform signal transfer.

It is accordingly an object of this invention to overcome the disadvantages and drawbacks of the known art and to provide processes, apparatuses, and systems for performing motion estimation with reduced computer memory usage, reduced signal transfer, and more uniform signal transfer.

Those skilled in the art will understand that these goals apply to other computer processes, in addition to motion estimation in video processing, that use two-dimensional caching. It is therefore a general object of this invention to provide improved processes, apparatuses, and systems for performing computer processing using two-dimensional caching.

Further objects and advantages of this invention will become apparent from the detailed description of a preferred embodiment which follows.

SUMMARY OF THE INVENTION

The present invention is a computer-implemented process, apparatus, and system for two-dimensional caching. Signals corresponding to an (p×q) first portion of a (m×n) region are stored in an (p×q) area of the computer memory, wherein p is less than or equal to m, and q is less than or equal to n. The signals in the (p×q) area are processed using a processor. Signals corresponding to a next portion of the (m×n) region are stored in the (p×q) area by overwriting a subset of the signals in the (p×q) area, wherein the next portion of the (m×n) region is smaller than the (p×q) first portion of the region. The signals in the (p×q) area are again processed using the processor. The storing and processing of signals are repeated to complete the processing of the signals of the (m×n) region.

The present invention is also a computer-implemented process, apparatus, and system for processing video signals. Video signals corresponding to an (p×q) first portion of a (m×n) search region of a previous frame are stored in an (p×q) search area of a computer memory, wherein p is less than or equal to m, and q is less than or equal to n. Video signals corresponding to an (r×s) reference block of a current image are compared to the video signals in the search area using a processor, wherein r is less than or equal to p, and s is less than or equal to q. Video signals corresponding to a next portion of the search region are stored in the search area by overwriting a subset of the video signals in the search area, wherein the next portion of the search region is smaller than the first portion of the search region. The video signals corresponding to the (r×s) reference block are again compared to the video signals in the search area using the processor. The storing and comparing of video signals are repeated to complete the comparison of the video signals of the (r×s) reference block to the video signals of the (m×n) search region. A motion vector is selected in accordance with the comparisons using the processor.

BRIEF DESCRIPTION OF THE DRAWINGS

Other objects, features, and advantages of the present invention will become more fully apparent from the following detailed description of the preferred embodiment, the appended claims, and the accompanying drawings in which:

FIGS. 5a–5g are graphical representations of the (32×32) search region of the previous frame that are used to illustrate the motion estimation processing of FIG. 4;

FIG. 10 is a graphical representation of the sequence of loading the video signals of (1×21) Portion #2 of the (32×32) search region of FIG. 5a into the (17×21) search area of on-chip memory;

FIG. 11 is a graphical representation of the sequence of loading the video signals of (1×21) Portion #3 of the (32×32) search region of FIG. 5a into the (17×21) search area of on-chip memory;

FIG. 12 is a graphical representation of the sequence of loading the video signals of (17×1) Portion #17 of the (32×32) search region of FIG. 5a into the (17×21) search area of on-chip memory;

FIG. 13 is a graphical representation of the sequence of loading the video signals of (17×1) Portion #33 of the (32×32) search region of FIG. 5b into the (17×21) search area of on-chip memory;

DESCRIPTION OF THE PREFERRED EMBODIMENT(S)

Figure 4:
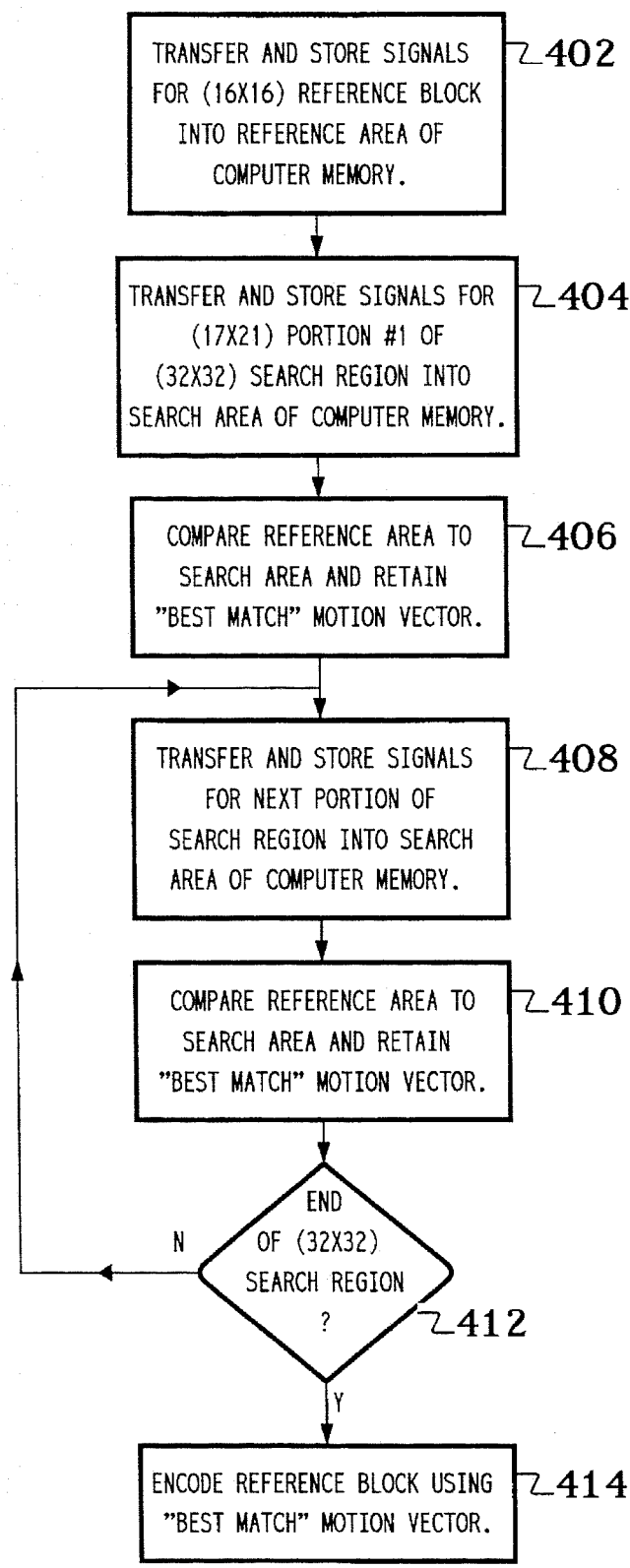
FIG. 4 is a process flow diagram of motion estimation processing according to a preferred embodiment of the present invention.

Referring now to FIG. 4, there is shown a process flow diagram of motion estimation processing according to a preferred embodiment of the present invention. The processing of FIG. 4 corresponds to motion estimation processing for a (16×16) reference block of a current frame and a (32×32) search region of a previous frame, where on-chip storage of the video signals for the (32×32) search region is limited to a (17×21) search area of computer memory. All of the video signals for the current frame and the previous frame are preferably stored in off-chip memory, such as in a RAM memory device.

Referring now to FIGS. 5a–5g, there are shown graphical representations of the (32×32) search region of the previous frame that will be used to illustrate the motion estimation processing of FIG. 4. Similarly, FIGS. 6a–6x are graphical representations of the (17×21) search area of the on-chip memory that will also be used to illustrate the motion estimation processing of FIG. 4.

Positions within the (32×32) search region and the (17×21) search area are represented by four pointers. An external row pointer $R_e$ and an external column pointer $C_e$ identify the row and column within the (32×32) search region. Similarly, an internal row pointer $R_i$ and an internal column pointer $C_i$ identify the row and column within the (17×21) search area. The external row pointer $R_e$ and the external column pointer $C_e$ may both range from 1 to 32. The internal row pointer $R_i$ may range from 1 to 17, while the internal column pointer $C_i$ may range from 1 to 21. The pointers may be used to identify the position of the upper left pixel of a (16×16) block of pixels. Those skilled in the art will understand that row and column offsets may be applied to the external pointers to identify the position of the current (32×32) search region within the previous frame.

Referring again to FIG. 4, motion estimation processing begins by transferring video signals for the (16×16) reference block of the current frame from off-chip memory and storing the video signals into a (16×16) reference area of on-chip memory (step 402 of FIG. 4). This reference area remains unchanged throughout the motion estimation processing of FIG. 4.

Figure 1A:
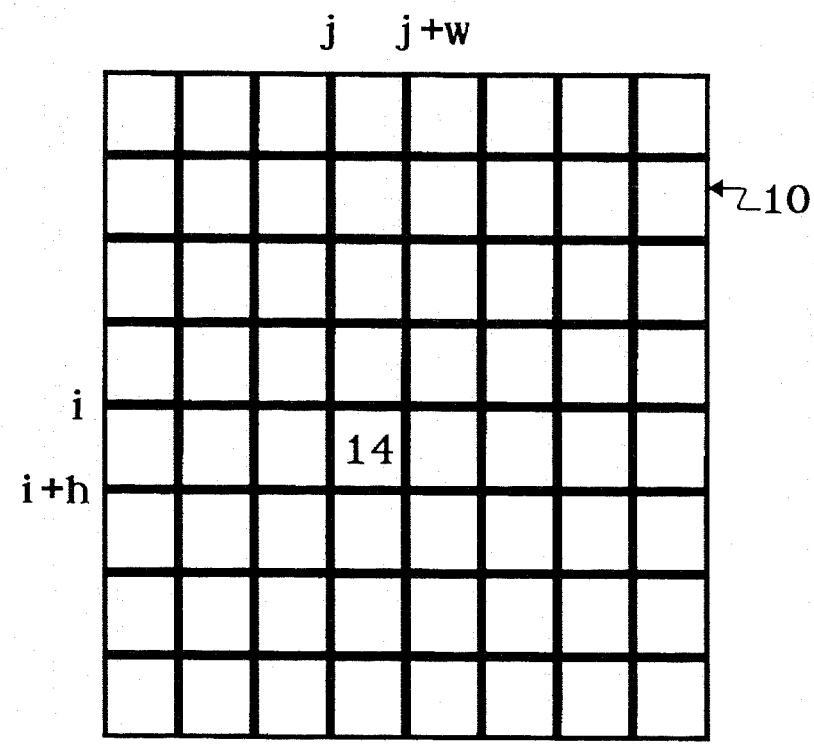
FIG. 1 is a graphical representation of a current frame and a previous frame used in motion estimation.
Figure 1B:
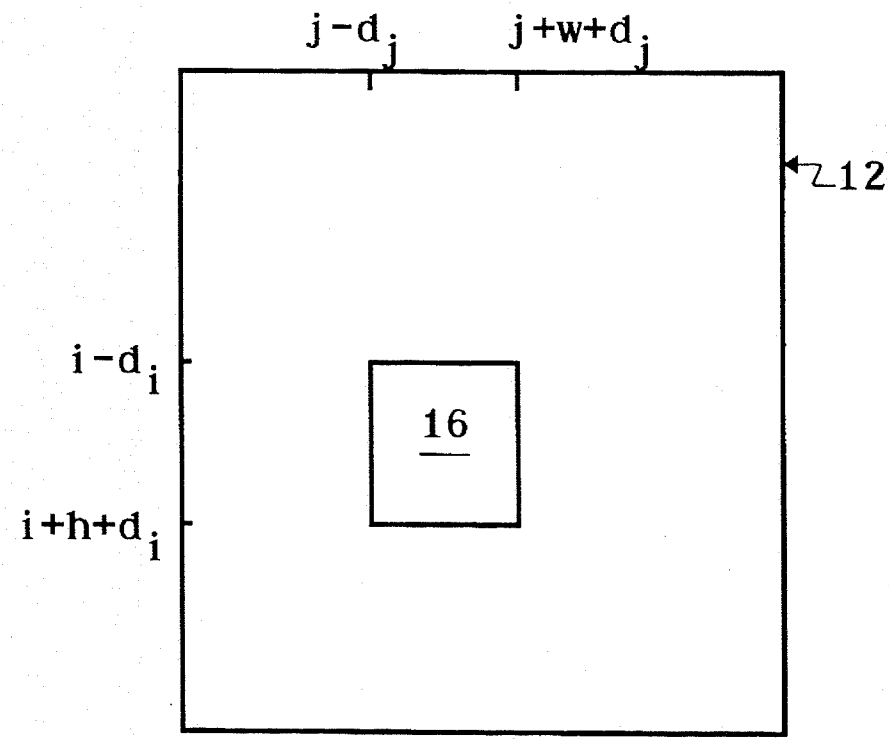
Figure 2:
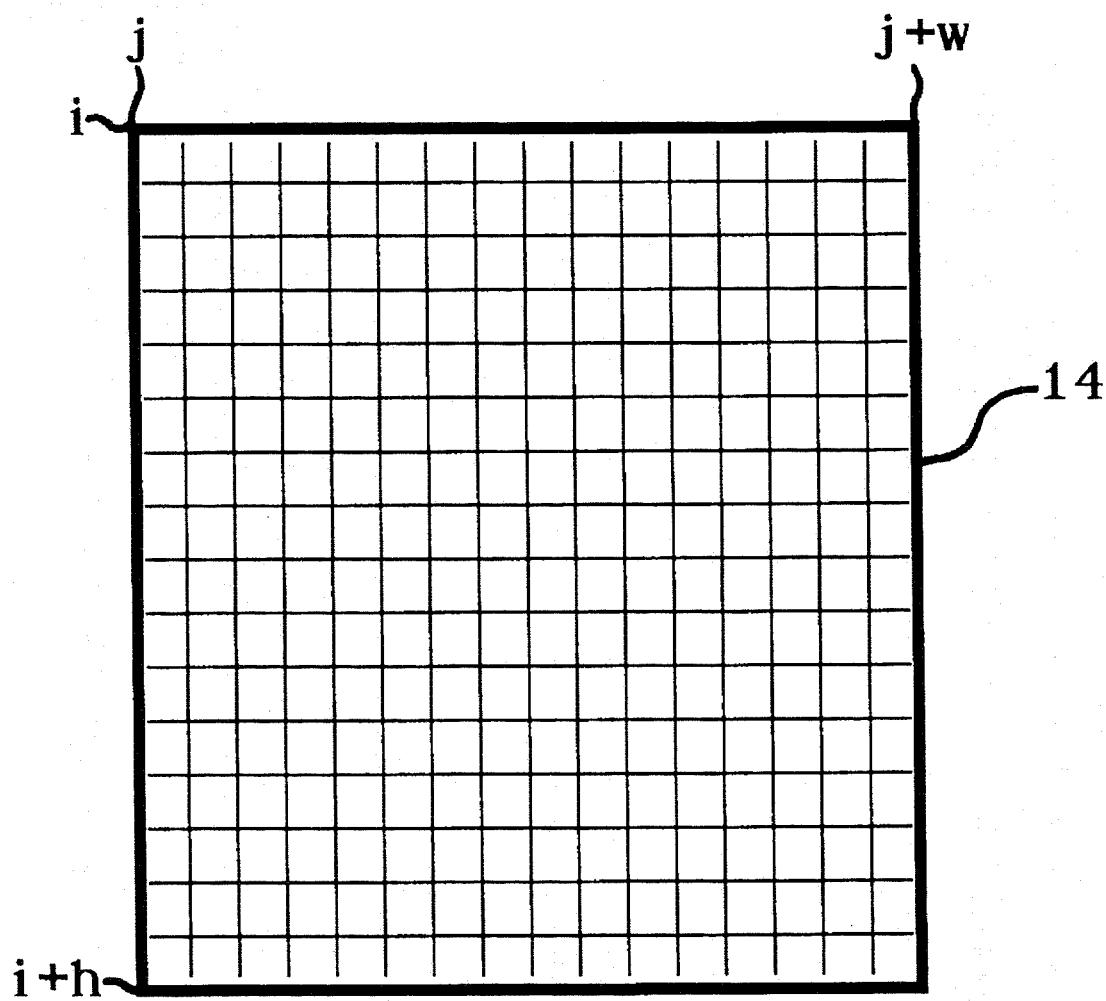
FIGS. 2 and 3 are graphical representations a reference block of the current frame of FIG. 1 and the corresponding search region of the previous frame of FIG. 1, respectively.
Figure 3:
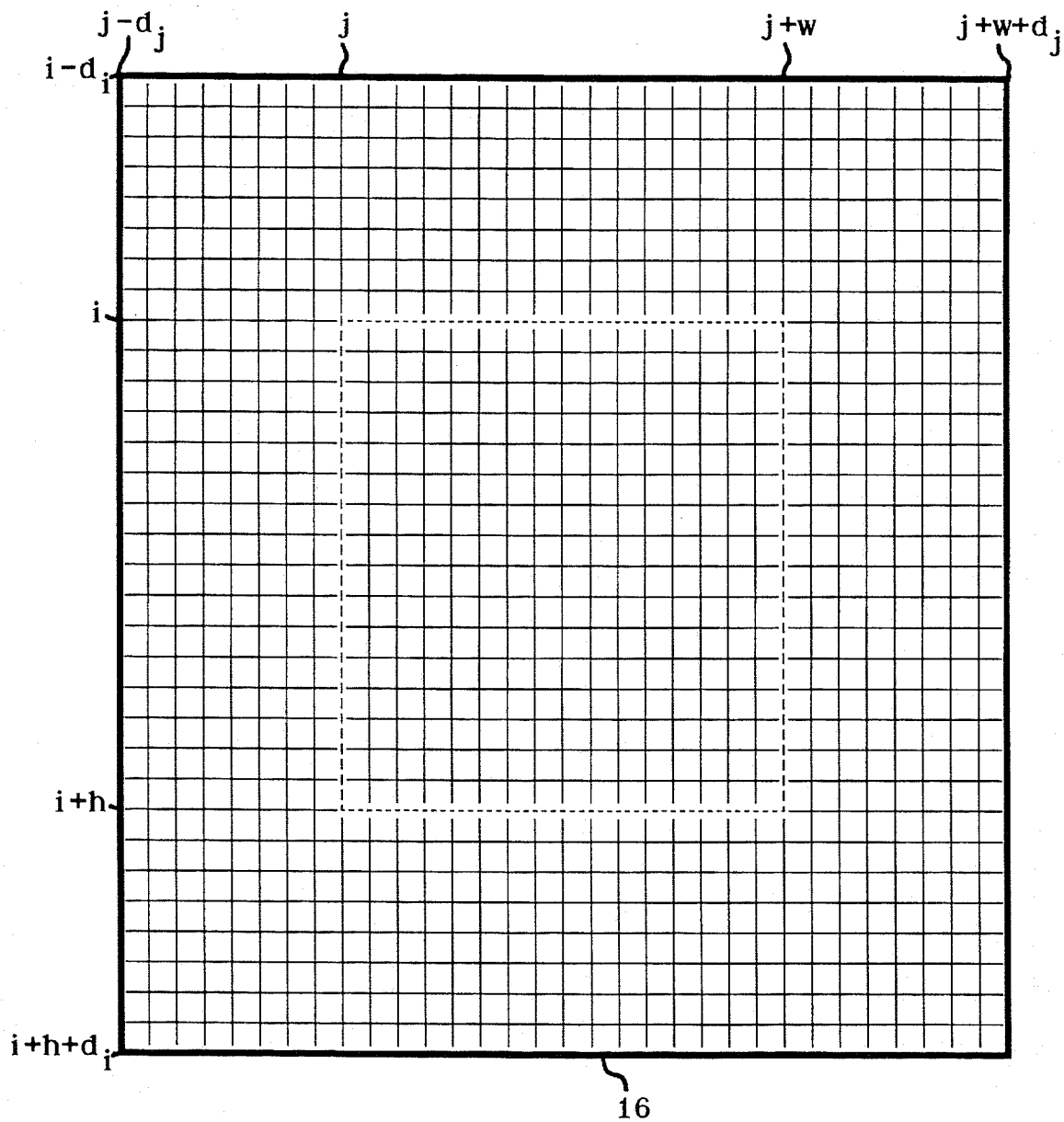
Figure 5A:
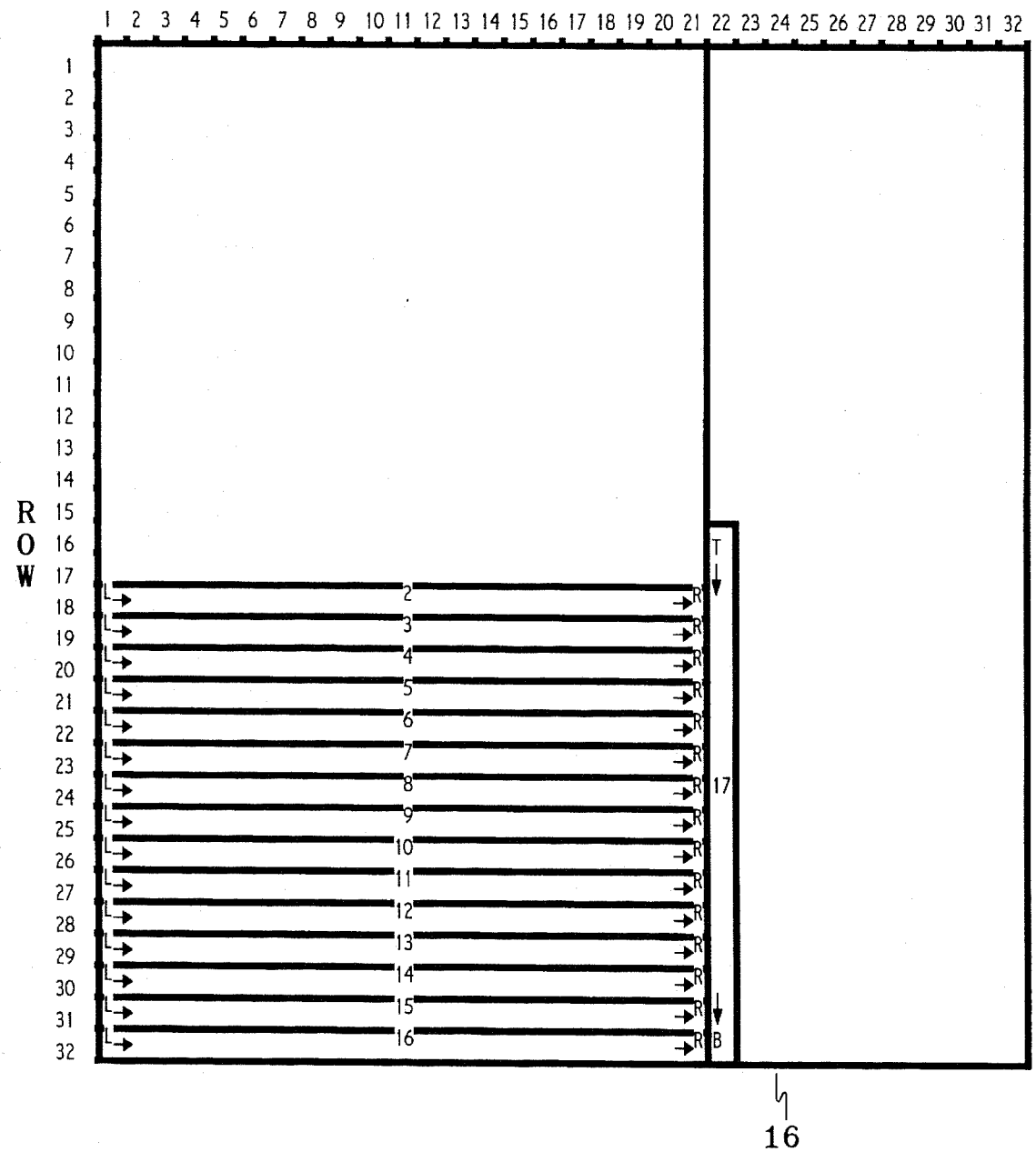

Video signals corresponding to a (17×21) first portion of the (32×32) search region of the previous frame are also transferred from off-chip memory and stored into the (17× 21) search area of on-chip memory (step 404). The center of the (32×32) search region of the previous frame preferably corresponds to the center of the (16×16) reference block of the current frame, as shown in FIGS. 1–3. As shown in FIG. 5a as Portion #1, the (17×21) first portion of the (32×32) search region preferably corresponds to the upper left corner of the search region. FIG. 6a represents the step of storing of the video signals corresponding to the (17×21) first portion into the (17×21) search area of on-chip memory.

The video signals stored in the (16×16) reference area of on-chip memory are then compared to the video signals stored in the (17×21) search area of on-chip memory (step 406). This comparison preferably involves comparing the (16×16) reference area to each (16×16) set of video signals in the (17×21) search area. Since there are 12 different (16×16) sets of video signals in the (17×21) search area, step 406 involves 12 separate comparisons.

Each comparison involves the generation of a measure that indicates the "closeness" of the match between the video signals in the (16×16) reference area and the current (16×16) set of video signals in the search area. A preferred measure q is the sum of the absolute value of the video signal differences between the two areas, which may be represented by Equation (1) as follows:

$$S = \sum_{i=0}^{15} \sum_{j=0}^{15} |R(i,j) - S(i,j)|, \quad (1)$$

where $R(i,j)$ is the video signal for a pixel in the reference area and $S(i,j)$ is the video signal for the corresponding pixel in the search area. Those skilled in the art will understand a smaller value of measure q indicates a closer match between the two sets of video signals. It will also be understood that measures other than the measure q may be used to indicate the closeness between the two sets of video signals.

During step 406, the motion vector corresponding to the (16×16) set of video signals in the search area that best matches the video signals in the (16×16) reference area is retained.

For the rest of this discussion, it will be understood that a "comparison" preferably involves (1) the generation of the measure q using the video signals in the (16×16) reference area of on-chip memory and a specified (16×16) set of video signals in the (17×21) search area of on-chip memory and (2) the retention of the motion vector corresponding to the best match so far.

Figure 7:
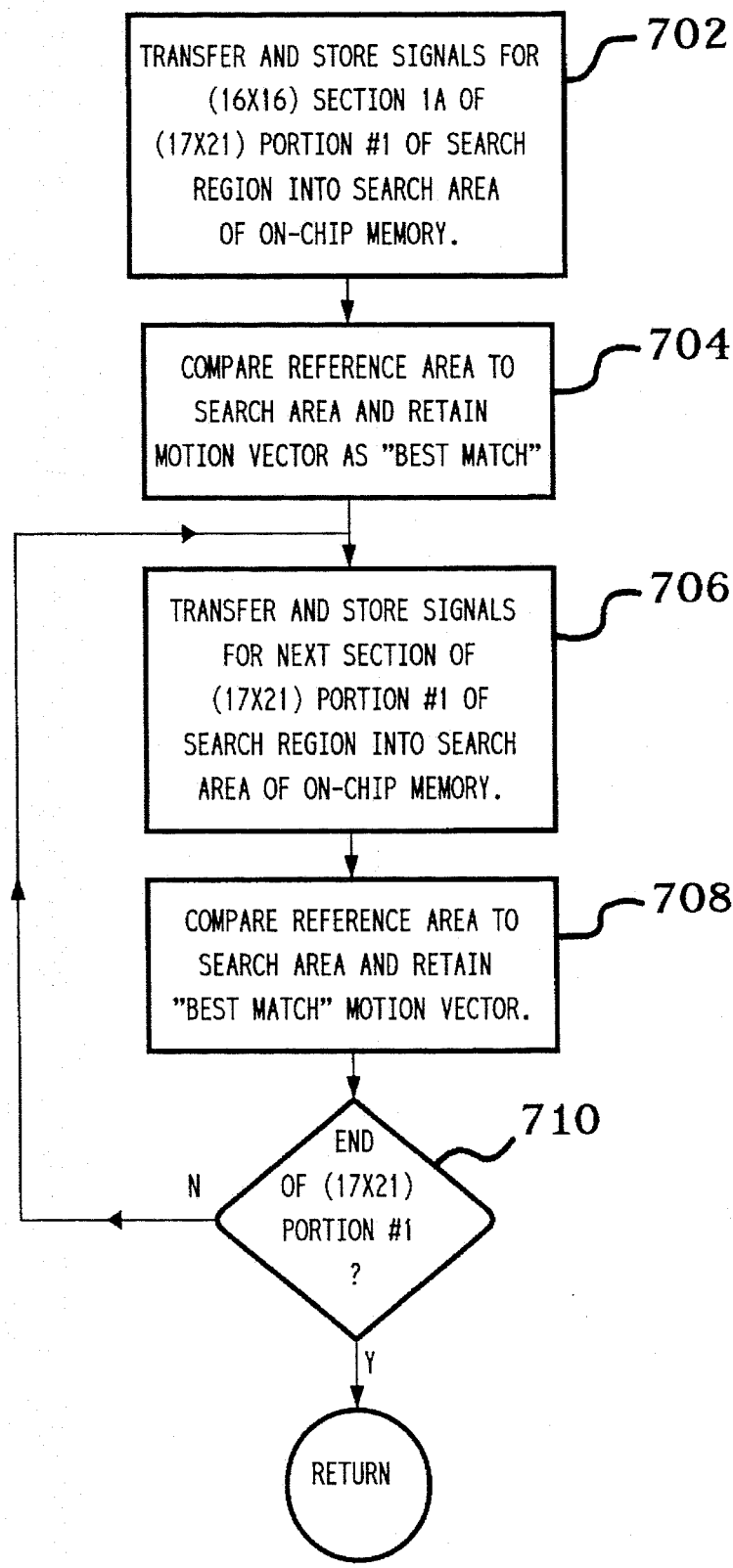
FIG. 7 is a process flow diagram of the processing of steps 404 and 406 of the motion estimation processing of FIG. 4.
Figure 8:
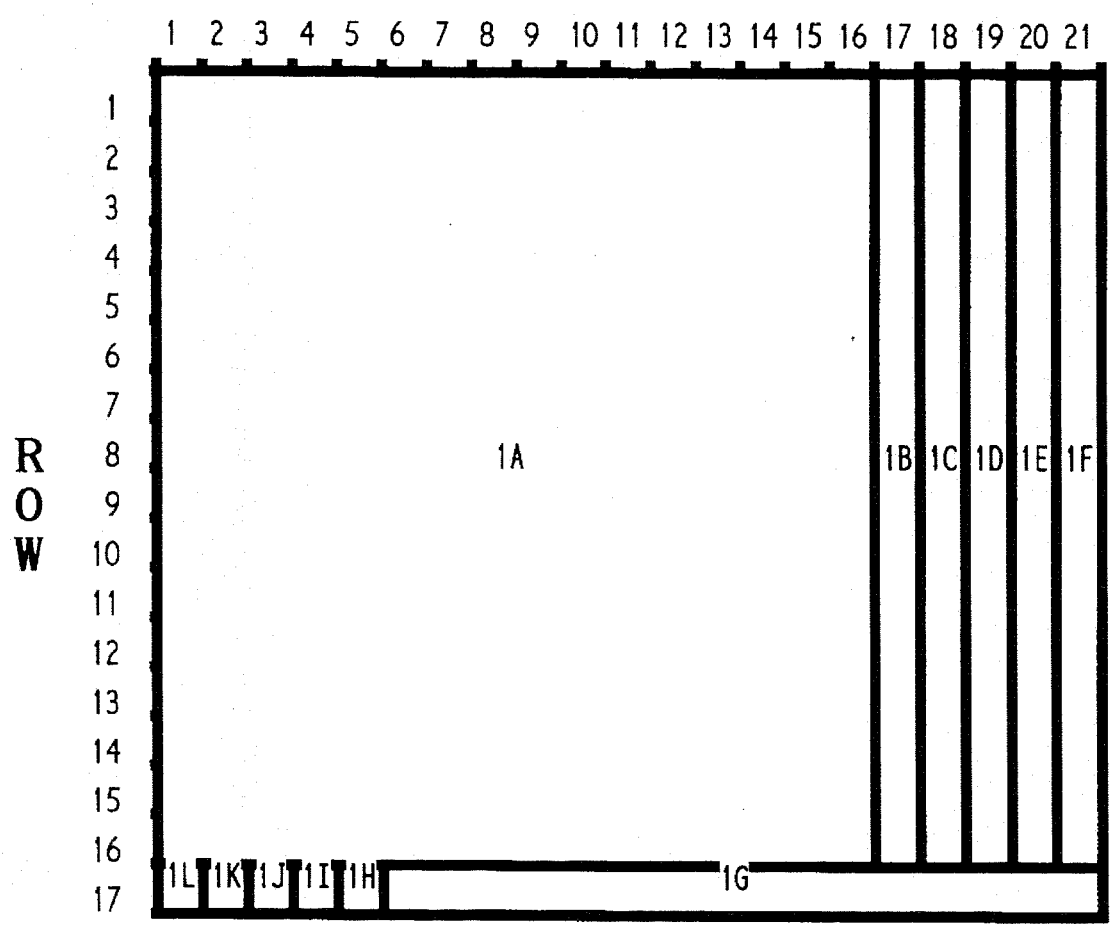
FIG. 8 is a graphical representation of the sequence of loading the video signals of (17×21) Portion #1 of the (32×32) search region of FIG. 5a into the (17×21) search area of on-chip memory.

Referring now to FIG. 7, there is shown a process flow diagram of the processing of steps 404 and 406 of the motion estimation processing of FIG. 4, according to a preferred embodiment of the present invention. Referring now to FIG. 8, there is shown a graphical representation of the sequence of loading the video signals of (17×21) Portion #1 of the (32×32) search region 16 of FIG. 5a into the (17×21) search area of on-chip memory.

As indicated in FIG. 7 and as shown in FIG. 8, the transfer and storage of (17×21) video signals of step 404 of FIG. 4 are interleaved with the 12 separate comparisons of step 406 of FIG. 4. In particular, the processing of FIG. 7 begins with the video signals corresponding to (16×16) Section 1A of FIG. 8 being transferred from off-chip memory and stored into the upper left corner of the (17×21) search area of on-chip memory (step 702 of FIG. 7). The video signals of (16×16) Section 1A correspond to the (16×16) block of (32×32) search region 16 identified by external pointers $(R_e,C_e)=(1,1)$, where (1,1) corresponds to the upper left pixel of the (16×16) block. These (16×16) video signals are stored into the (16×16) section of on-chip memory identified by internal pointers $(R_i, C_i)=(1,1)$.

A comparison is then performed using the (16×16) video signals identified by internal pointers $(R_i, C_i)=(1,1)$ (step 704).

After the comparison of step 704, the video signals corresponding to (16×1) Section 1B of FIG. 8 are transferred from off-chip memory and stored in the (17×21) search area of on-chip memory (step 706). Another comparison is then performed using the (16×16) video signals identified by internal pointers $(R_i, C_i)=(1,2)$ (step 708).

The processing of steps 706 and 708 is repeated for (16×1) Sections 1C, 1D, 1E, and 1F, (1×16) Section 1G, and (1×1)Sections 1H, 1I, 1J, 1K, and 1L of FIG. 8, until all of the video signals of (17×21) Portion #1 of FIG. 5a have been processed (as determined in step 710 of FIG. 7. Each implementation of steps 706 and 708 involves the transfer and storage of video signals for one more comparison.

Table 1 shows the internal and external pointers corresponding to the comparisons performed after each of Sections 1A–1L of Portion #1 of FIG. 5a are transferred and stored from off-chip to on-chip memory. The internal pointers identify the location of the upper left corner of the (16×16) block of video signals in the (17×21) search area of on-chip memory. The external pointers identify the upper left corner of the corresponding (16×16) block of video signals in the (32×32) search region in off-chip memory.

TABLE I

Internal and External Pointers for Comparisons for Sections 1A–1L of (17 × 21) Portion #1.

| SECTION | INTERNAL POINTERS | EXTERNAL POINTERS |
| --- | --- | --- |
| 1A | (1,1) | (1,1) |
| 1B | (1,2) | (1,2) |
| 1C | (1,3) | (1,3) |
| 1D | (1,4) | (1,4) |
| 1E | (1,5) | (1,5) |
| 1F | (1,6) | (1,6) |
| 1G | (2,6) | (2,6) |
| 1H | (2,5) | (2,5) |
| 1I | (2,4) | (2,4) |
| 1J | (2,3) | (2,3) |
| 1K | (2,2) | (2,2) |
| 1L | (2,1) | (2,1) |

Referring again to FIG. 4, after completing all 12 comparisons for the video signals corresponding to (17×21) Portion #1 (steps 404 and 406), the video signals corresponding to (1×21) Portion #2 of the (32×32) search region 16 of FIG. 5a are transferred from off-chip memory and stored in the (17×21) search area of on-chip memory (step 408). Since the (17×21) search area was completely filled with video signals after step 404, the video signals corresponding to Portion #2 are stored in step 408 into the (17×21) search area by overwriting a (1×21) subset of the video signals corresponding to Portion #1. FIG. 6b shows where (1×21) Portion #2 is stored in the (17×21) search area of on-chip memory. The left and right arrows in FIGS. 5a and 6b indicate the spatial relationships for the video signals of (1×21) Portion #2 between the (32×32) search region 16 of FIG. 5a and the (17×21) search area of FIG. 6b. Six comparisons are then implemented using the video signals stored in the (17×21) search area of on-chip memory (step 410).

Figure 9:
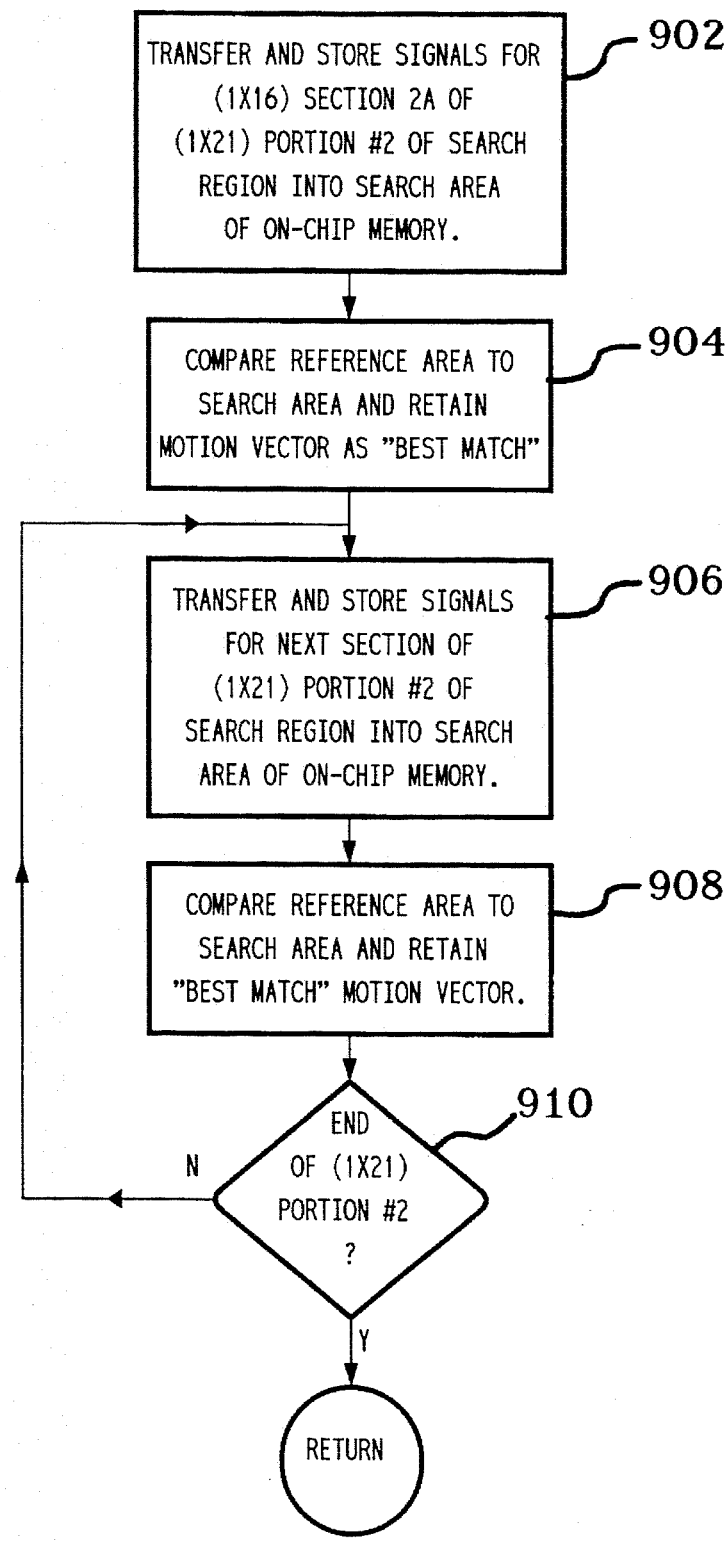
FIG. 9 is a process flow diagram of the processing of steps 408 and 410 of the motion estimation processing of FIG. 4 when the next portion of the search region corresponds to a (1×21) row of the (32×32) search region.
Figure 10:
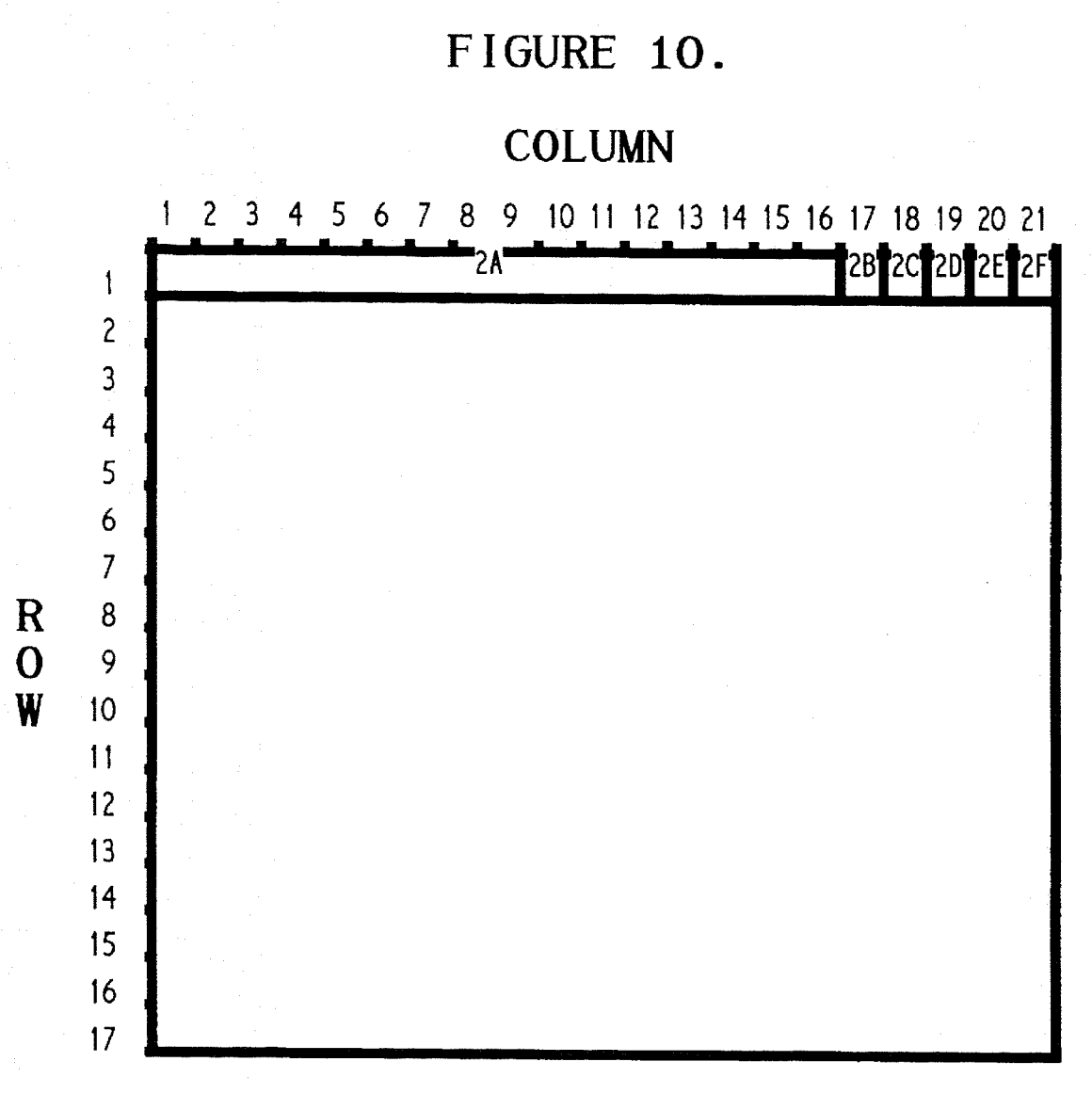

Referring now to FIG. 9, there is shown a process flow diagram of the processing of steps 408 and 410 of the processing of FIG. 4 for (1×21) Portion #2, according to a preferred embodiment of the present invention. Referring now to FIG. 10, there is shown a graphical representation of the sequence of loading the video signals of (1×21) Portion #2 of the (32×32) search region 16 of FIG. 5a into the (17×21) search area of on-chip memory.

As indicated in FIG. 9 and as shown in FIG. 10, the transfer and storage of (1×21) video signals of step 408 of FIG. 4 are interleaved with 6 separate comparisons of step 410 of FIG. 4. In particular, the processing of FIG. 9 begins with the video signals corresponding to (1×16) Section 2A of FIG. 10 being transferred from off-chip memory and stored into the upper left corner of the (17×21) search area of on-chip memory (step 902 of FIG. 9).

A comparison is then performed using the (16×16) video signals identified by internal pointers $(R_i, C_i)=(3,1)$ (step 904). Those skilled in the art will understand that the (16×16) video signals identified by internal pointers $(R_i, C_i)=(3,1)$ include the video signals of (1×16) Section 2A of FIG. 10. As such, the comparison of step 904 takes into account the wrapping of the (16×16) video signals within the (17,21) search area of on-chip memory. It will be understood that such wrapping may be accommodated by using modulo-based computations using the row and column dimensions of the (17×21) search area of on-chip memory.

After the comparison of step 904, the video signal corresponding to (1×1) Section 2B of FIG. 10 is transferred from off-chip memory and stored in the (17×21) search area of on-chip memory (step 906). Another comparison is then performed using the (16×16) video signals identified by internal pointers $(R_i, C_i)=(3,2)$ (step 908).

The processing of steps 906 and 908 is repeated for (1×1) Sections 2C, 2D, 2E, and 2F until all of the video signals of (1×21) Portion #2 of FIG. 5a have been processed (as determined in step 910). Each implementation of steps 906 and 908 involves the transfer and storage of video signals for one more comparison.

Table II shows the internal and external pointers corresponding to the six comparisons performed after each of Sections 2A–2F of Portion #2 of FIG. 5a are transferred and stored from off-chip to on-chip memory.

TABLE II

| | Internal and External Pointers for Comparisons for Sections 2A–2F of (1 × 21) Portion #2. | |
|---|---|---|
| SECTION | INTERNAL POINTERS | EXTERNAL POINTERS |
| 2A | (3,1) | (3,1) |
| 2B | (3,2) | (3,2) |
| 2C | (3,3) | (3,3) |
| 2D | (3,4) | (3,4) |

TABLE II-continued

| | Internal and External Pointers for Comparisons for Sections 2A–2F of (1 × 21) Portion #2. | |
|---|---|---|
| SECTION | INTERNAL POINTERS | EXTERNAL POINTERS |
| 2E | (3,5) | (3,5) |
| 2F | (3,6) | (3,6) |

Referring again to FIG. 4, after completing all 6 comparisons for the video signals corresponding to (1×21) Portion #2 (steps 408 and 410), the processing of steps 408 and 410 is repeated for (1×21) Portion #3 of the (32×32) search region 16 of FIG. 5a. FIG. 6b shows where (1×21) Portion #3 is stored in the (17×21) search area of on-chip memory. Processing (1×21) Portion #3 comprises six new comparisons.

Figure 11:
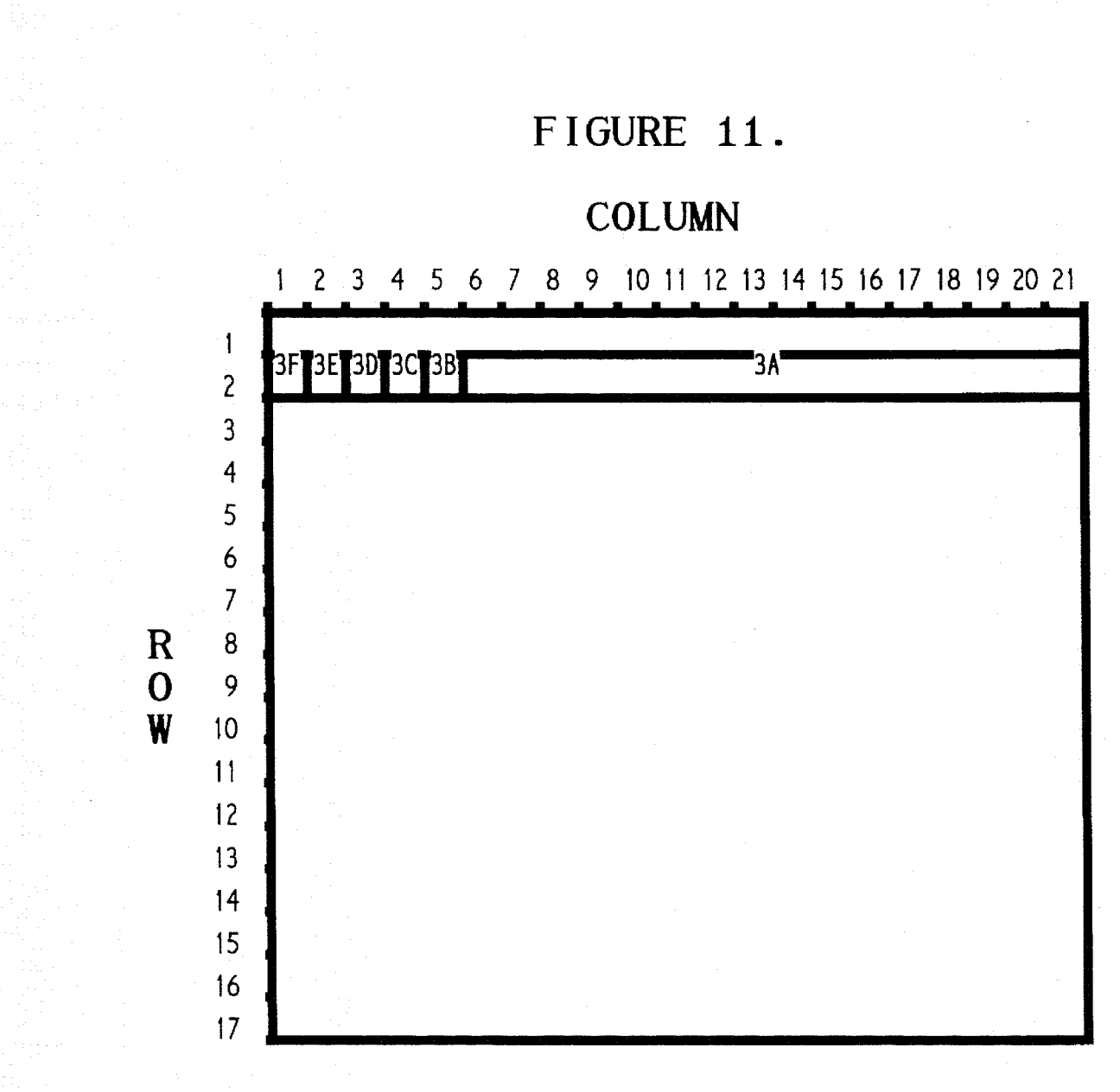

Referring now to FIG. 11, there is shown a graphical representation of the sequence of loading the video signals of (1×21) Portion #3 of the (32×32) search region 16 of FIG. 5a into the (17×21) search area of on-chip memory. Table III shows the internal and external pointers corresponding to the six comparisons performed after each of Sections 3A–3F of Portion #3 of FIG. 5a are transferred and stored from off-chip to on-chip memory.

TABLE III

| | Internal and External Pointers for Comparisons for Sections 3A–3F of (1 × 21) Portion #3. | |
|---|---|---|
| SECTION | INTERNAL POINTERS | EXTERNAL POINTERS |
| 3A | (4,6) | (4,6) |
| 3B | (4,5) | (4,5) |
| 3C | (4,4) | (4,4) |
| 3D | (4,3) | (4,3) |
| 3E | (4,2) | (4,2) |
| 3F | (4,1) | (4,1) |

The processing of steps 408 and 410 of FIG. 4 is repeated for each of (1×21) Portions #4–16 of the (32×32) search region 16 of FIG. 5a. FIG. 6b shows where each of Portions #4–16 is stored in the (17×21) search area of on-chip memory. Processing of each of Portions #4–16 comprises six new comparisons. Those skilled in the art will understand that the sequence of loading the six sections of Portions #4, 6, 8, 10, 12, 14, and 16 is analogous to the sequence shown in FIG. 10, while the sequence for Portions #7, 9, 11, 13, and 15 is analogous to the sequence shown in FIG. 11.

It will also be understood that the internal and external pointers are analogous to those shown in Tables II and III with incremented row pointers $R_i$ and $R_e$. For example, Table IV shows the internal and external pointers corresponding to the six comparisons performed after each of Sections 16A–16F of Portion #16 of FIG. 5a are transferred and stored from off-chip to on-chip memory.

TABLE IV

| | Internal and External Pointers for Comparisons for Sections 16A–16F of (1 × 21) Portion #16. | |
|---|---|---|
| SECTION | INTERNAL POINTERS | EXTERNAL POINTERS |
| 16A | (17,1) | (17,1) |
| 16B | (17,2) | (17,2) |

TABLE IV-continued

Internal and External Pointers for Comparisons for Sections 16A–16F of (1 × 21) Portion #16.

| SECTION | INTERNAL POINTERS | EXTERNAL POINTERS |
| --- | --- | --- |
| 16C | (17,3) | (17,3) |
| 16D | (17,4) | (17,4) |
| 16E | (17,5) | (17,5) |
| 16F | (17,6) | (17,6) |

Portions #1–16 of the (32×32) search region 16 of FIG. 5a correspond to 102 different comparisons. These 102 comparisons represent all of the possible comparisons using (16×16) blocks of video signals of the left-most (32×21) region of the (32×32) search region 16 of FIG. 5a. After Portion #16 is processed, the (17×21) search area of on-chip memory contains the video signals corresponding to Rows 16–32 and Columns 1–21 of the (32×32) search region 16 of FIG. 5a. At that juncture, the video signals corresponding to external row pointer $R_e=16$ are stored in the (17×21) search area of on-chip memory in the row corresponding to internal row pointer $R_e=16$, while the video signals corresponding to external row pointer $R_e=32$ are stored in the (17×21) search area of on-chip memory in the row corresponding to internal row pointer $R_e=15$.

Figures 6A, 6B:
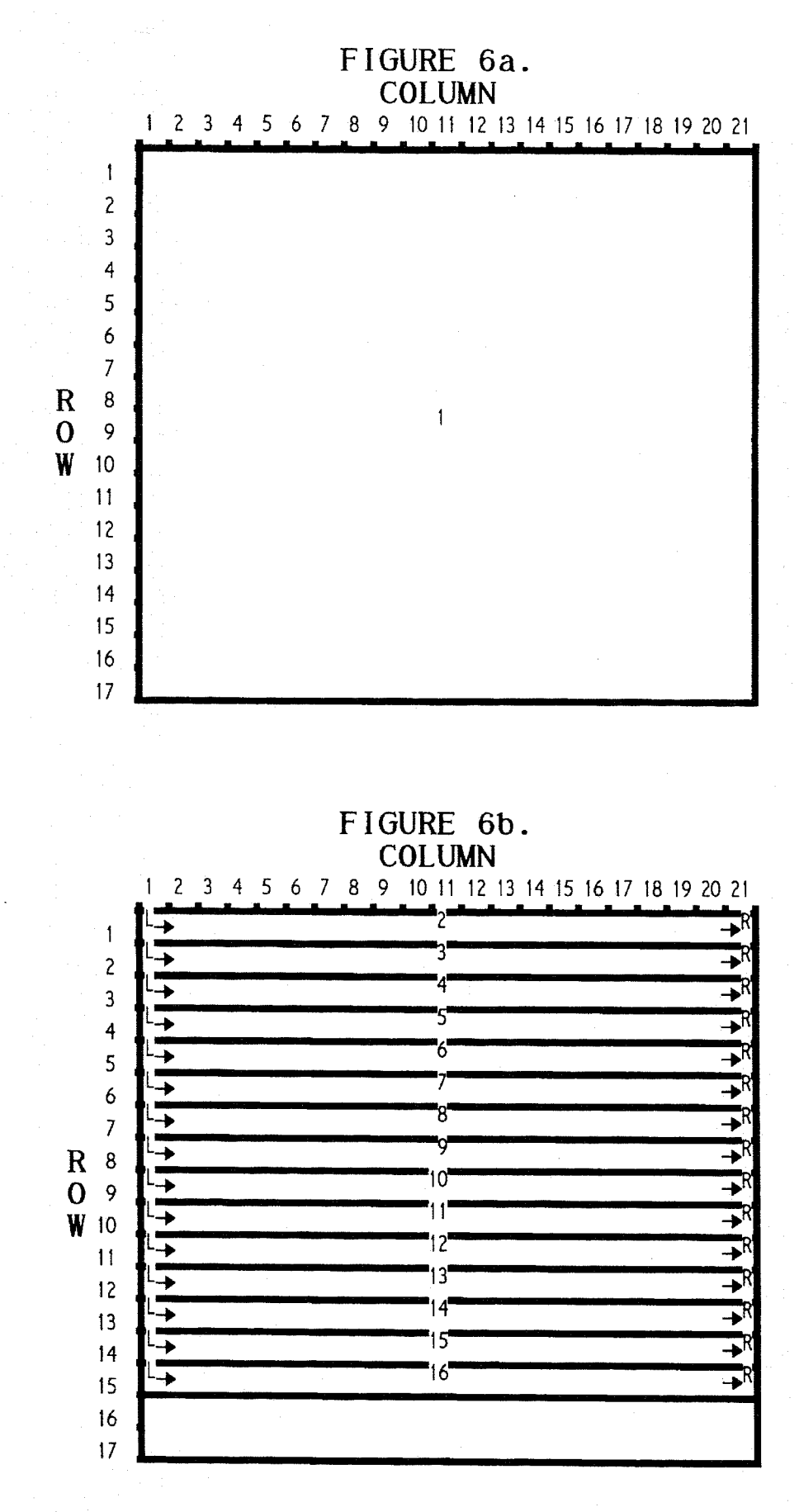
Figure 6C:
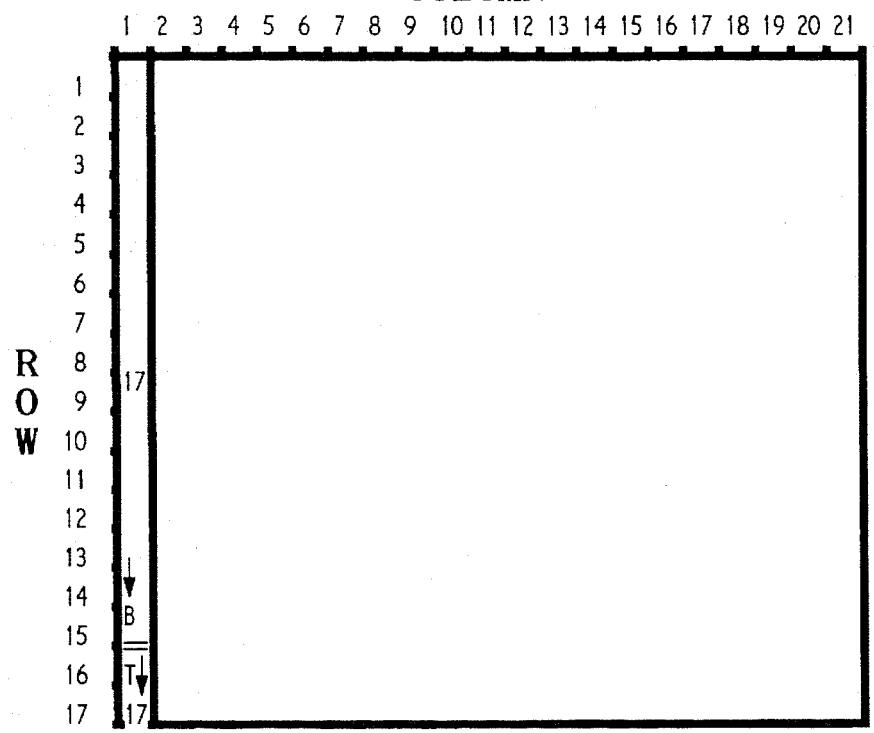
FIGS. 6a–6x are graphical representations of the (17×21) search area of the on-chip memory that are also used to illustrate the motion estimation processing of FIG. 4.

After Portion #16 is processed, the processing of steps 408 and 410 of FIG. 4 is then repeated for (17×1) Portion #17 of the (32×32) search region 16 of FIG. 5a. FIG. 6c shows where Portion #17 is stored in the (17×21) search area of on-chip memory. The top and bottom arrows in FIGS. 5a and 6c indicate the spatial relationships for the video signals of (17×1) Portion #17 between the (32×32) search region 16 of FIG. 5a and the (17×21) search area of FIG. 6c. Note that the top two pixels of Portion #17 in FIG. 5a correspond to the bottom two pixels of Portion #17 in FIG. 6c. Those skilled in the art will understand that this spatial phasing maintains the proper spatial relationships for the video signals in the (17×21) on-chip area. Processing of Portion #17 comprises two new comparsions.

Figure 12:
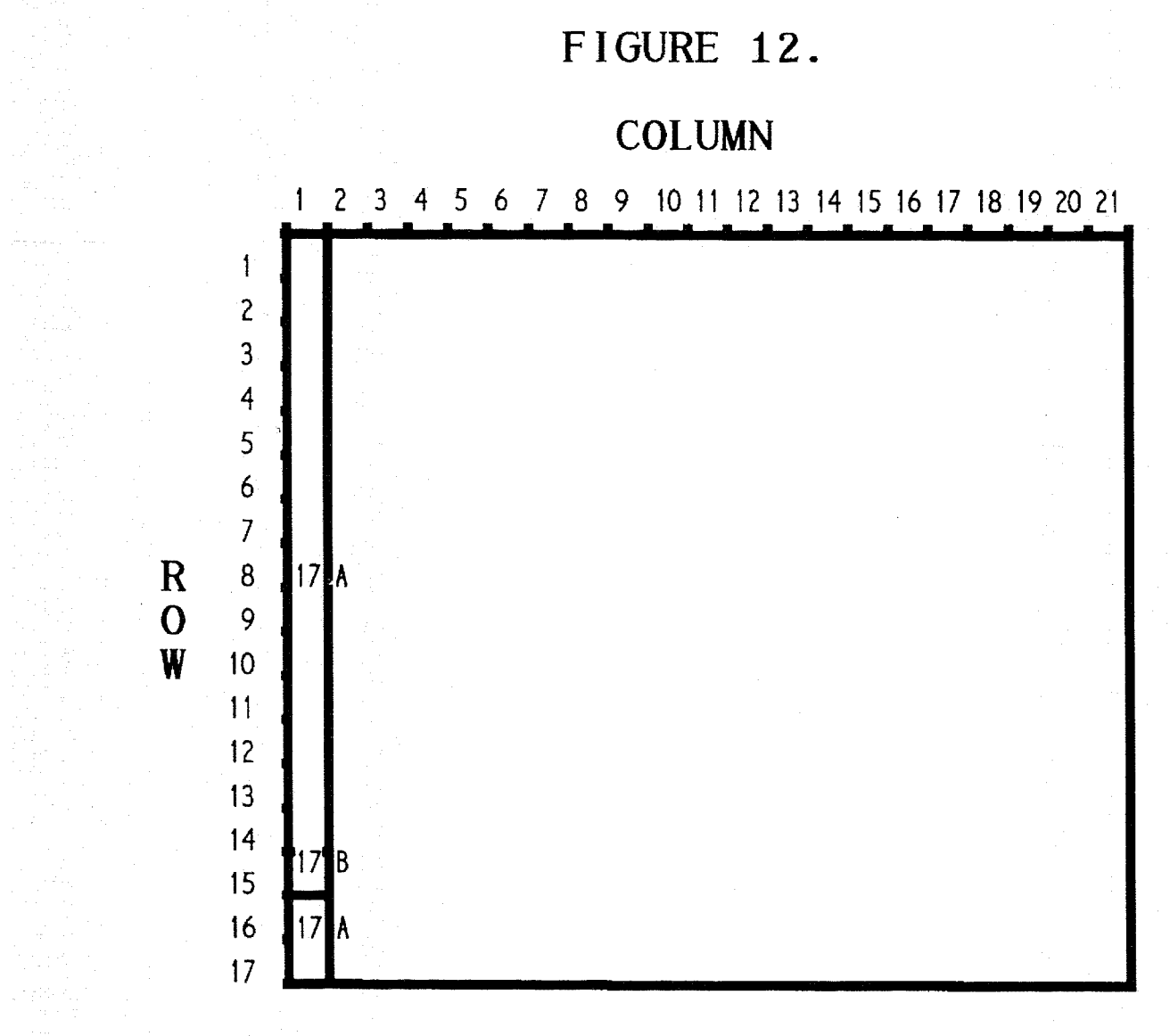

Referring now to FIG. 12, there is shown a graphical representation of the sequence of loading the video signals of 17×1) Portion #17 of the (32×32) search region 16 of FIG. 5a into the (17×21) searcj area on-chip memory. (16×1) Section 17A of Portion 190 17 corresponds to the pixels in Column 22 and Rows 17–32 of the (32×32) search region 16 of FIG. 5a, where scarch region pixel (17,22) is loaded into pixel (17,1) of the (17×21) search area of FIG. 6c, while search region pixel (32,22) is loaded into pixel (15,1) of FIG. 6c. (1×1) Section 17B of Portion #17 corresponds to search region pixel (16,22) and is loaded into pixel (16,1) of the (17×21) search area of FIG. 6c.

Table V shows the internal and external pointers corresponding to the two comparisons performed after Sections 17A and 17B of Portion #17 of FIG. 5a are transferred and stored from off-chip to on-chip memory.

TABLE V

Internal and External Pointers for Comparisons for Sections 17A and 17B of (17 × 1) Portion #17.

| SECTION | INTERNAL POINTERS | EXTERNAL POINTERS |
| --- | --- | --- |
| 17A | (17,7) | (17,7) |
| 17B | (16,7) | (16,7) |

Figure 5B:
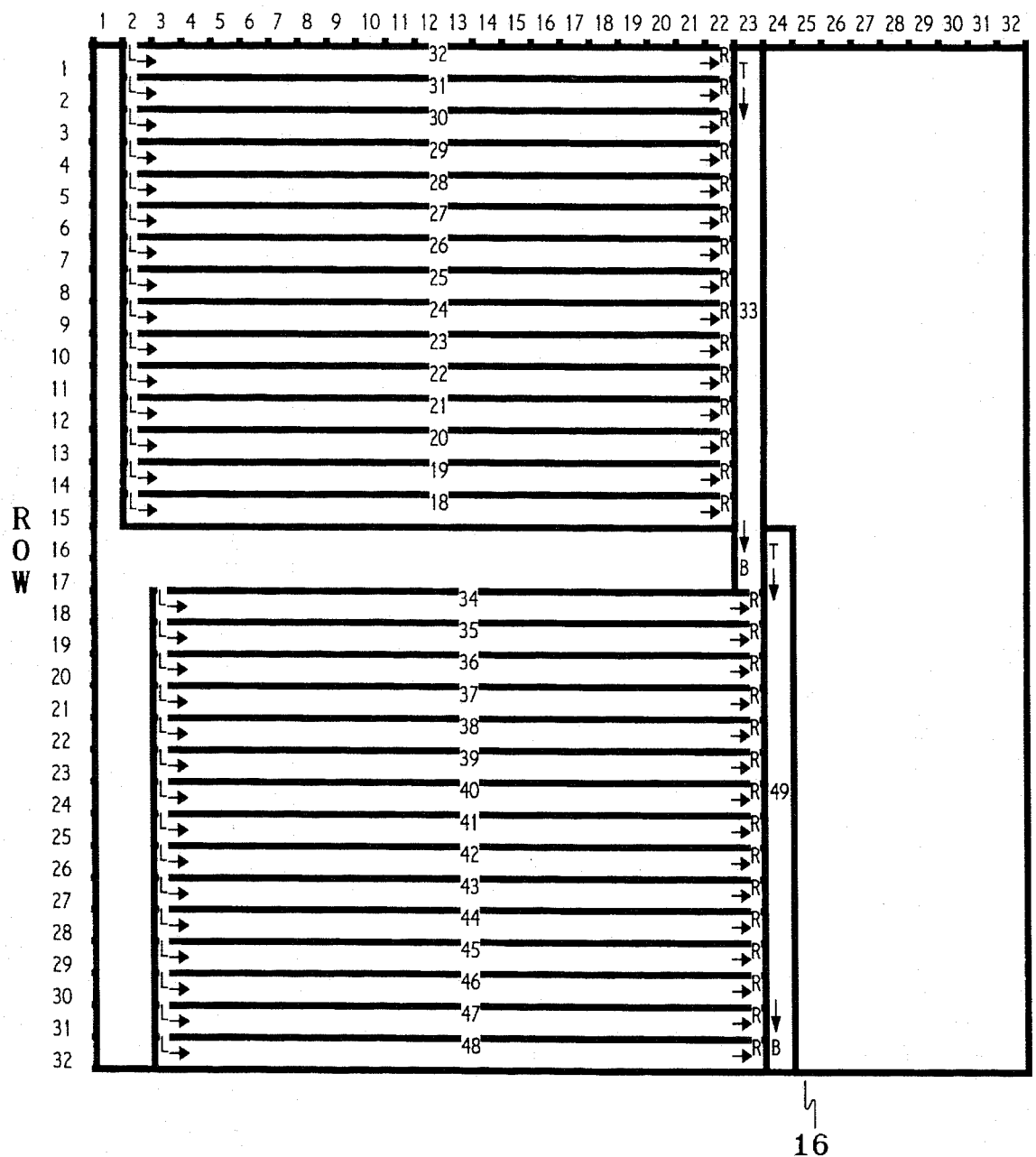
Figure 5C:
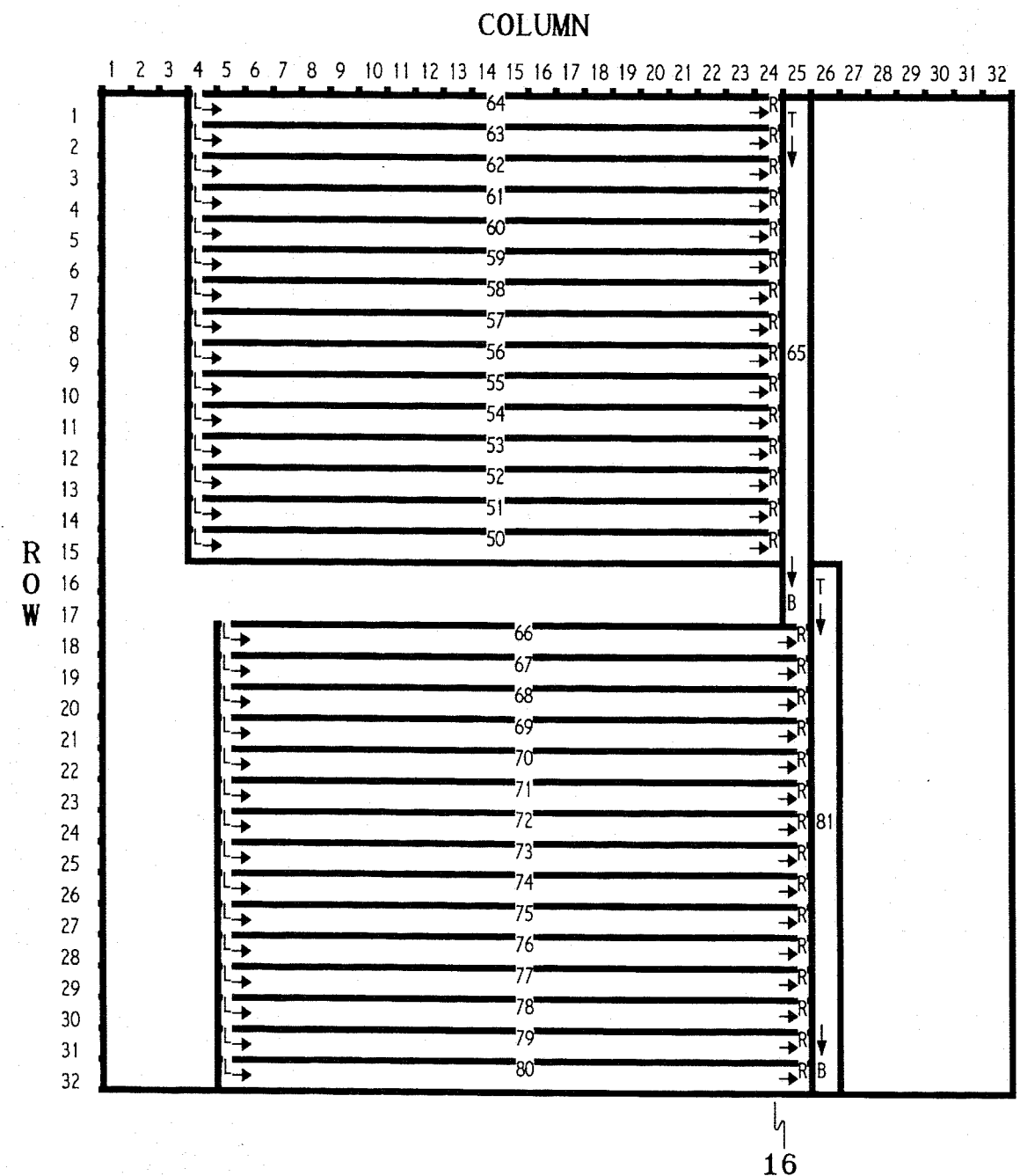
Figure 5D:
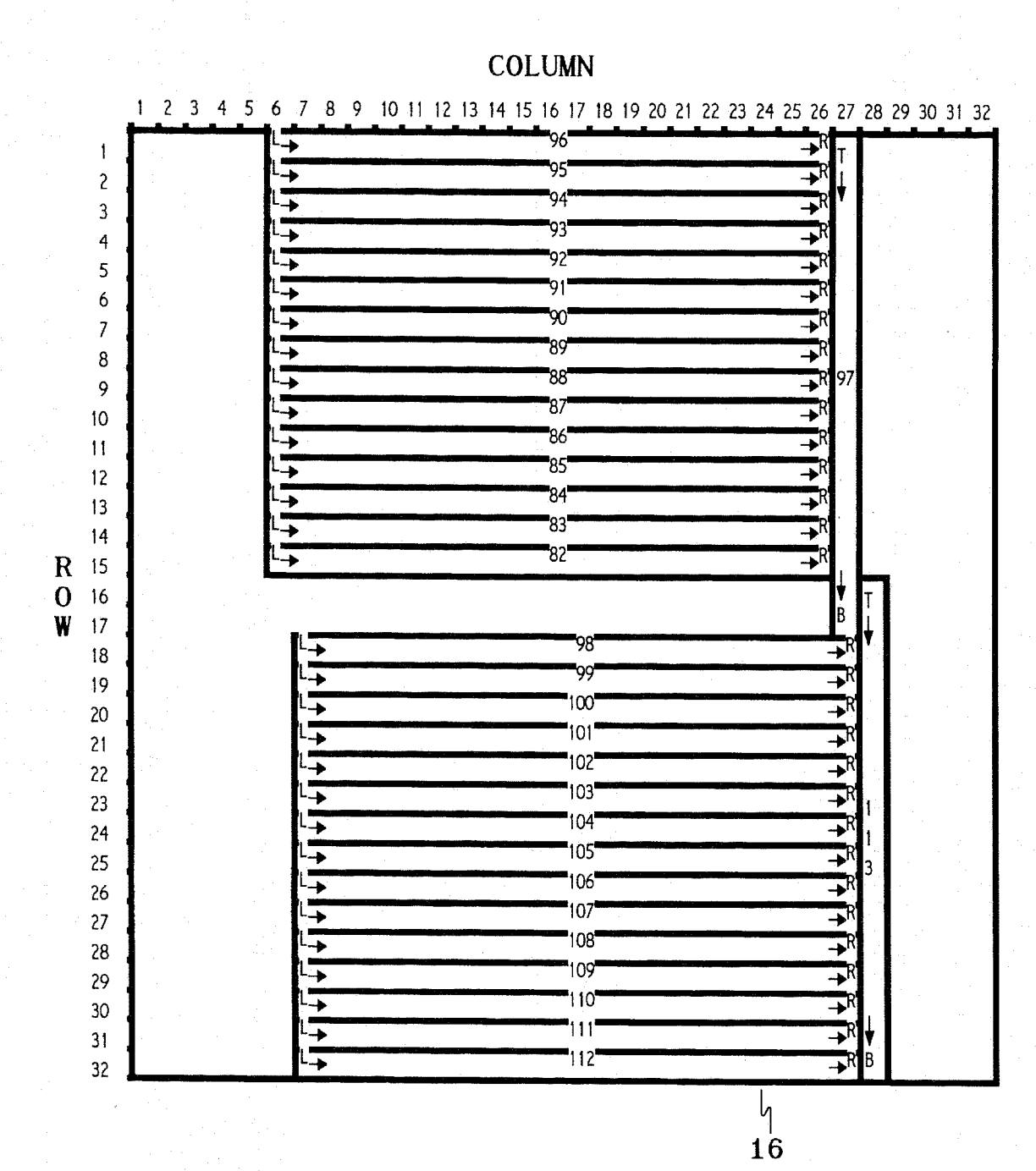
Figure 5E:
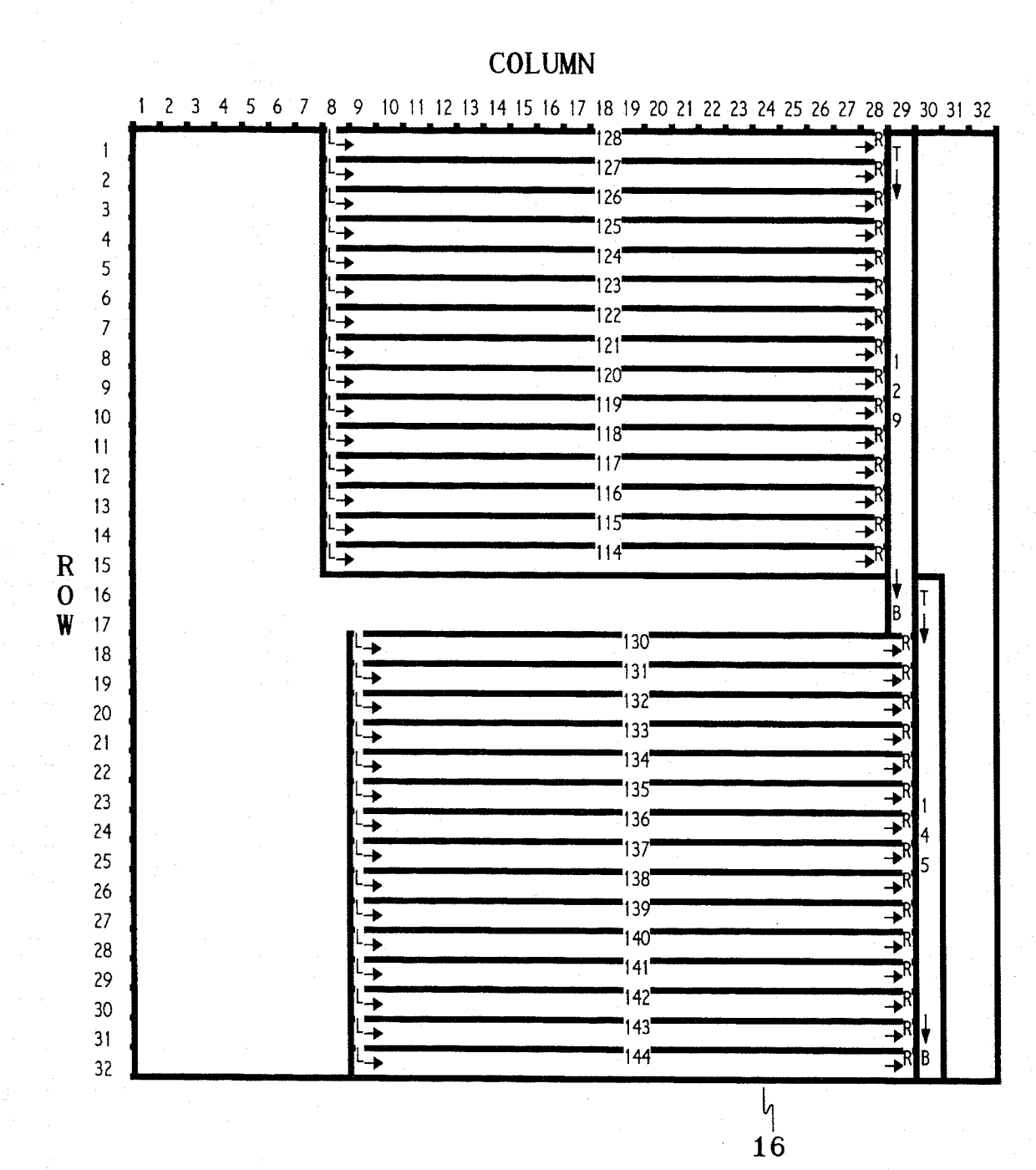
Figure 5F:
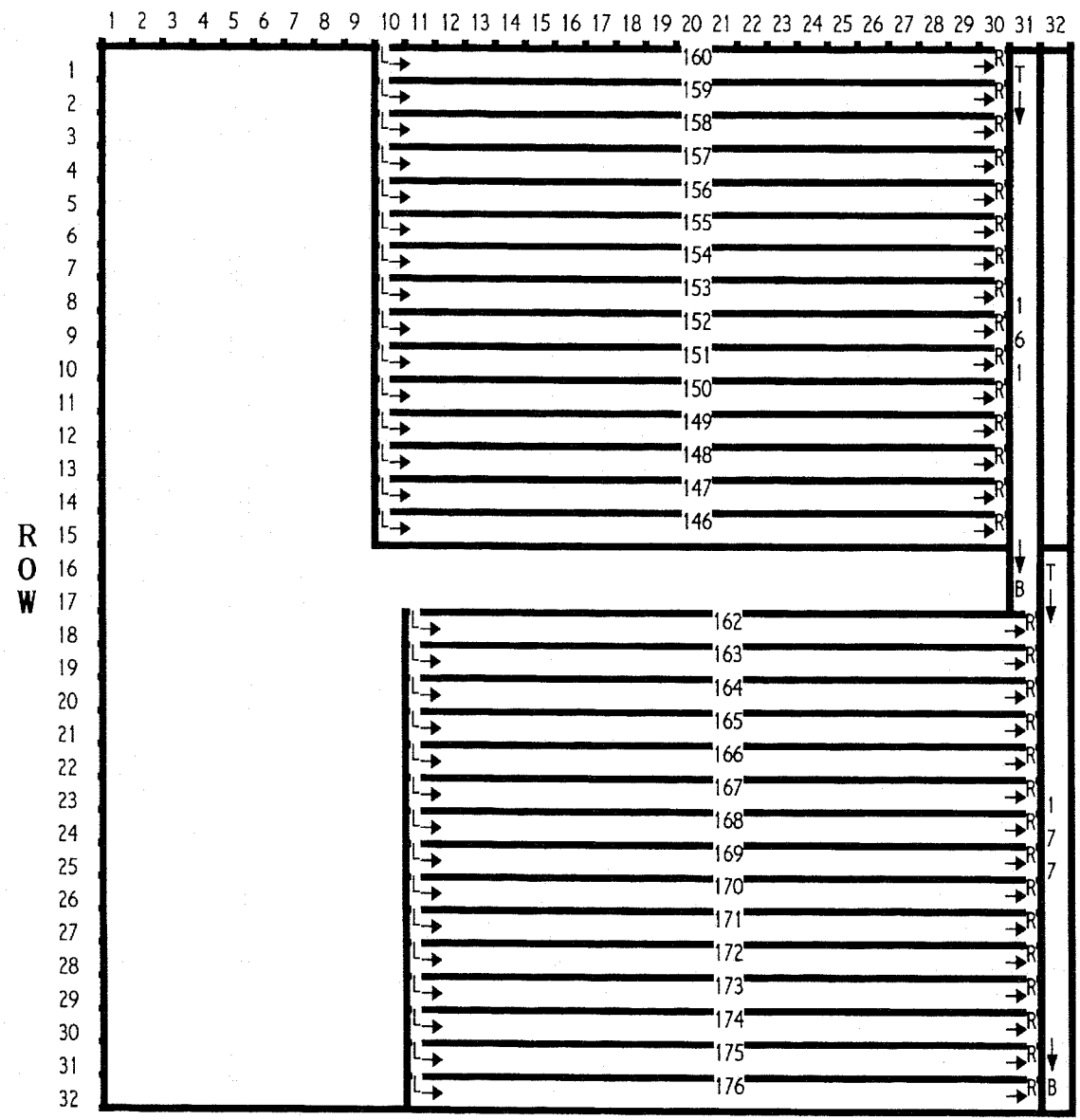
Figure 6D:
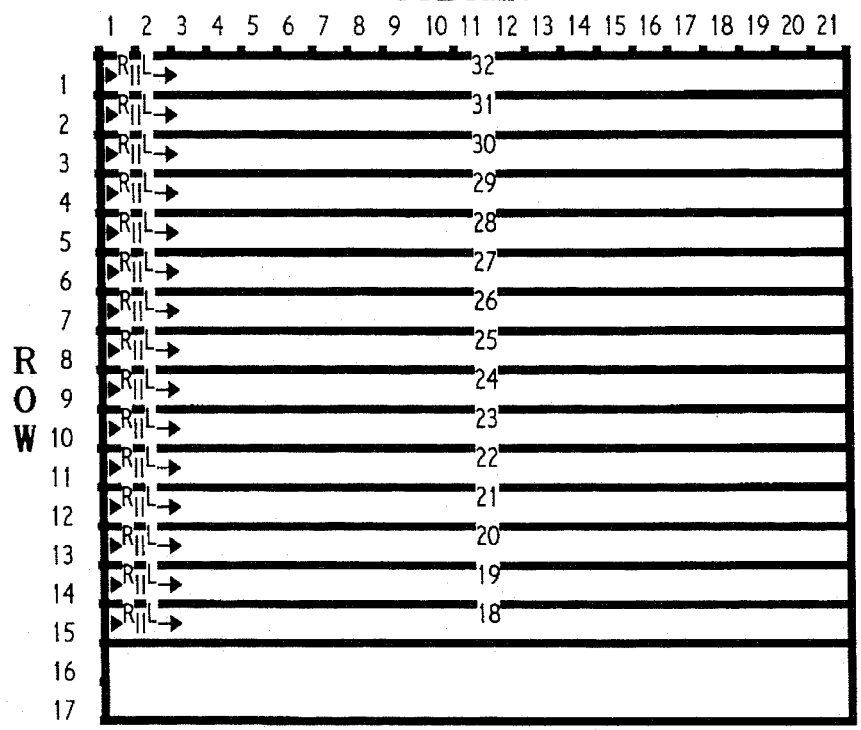

After Portion #17 is processed, the processing of steps 408 and 410 of FIG. 4 is repeated for each of (1×16) Portions #18–32 of the (32×32) search region 16 of FIG. 5b. FIG. 6d shows where each of Portions #18–32 is stored in the (17×21) search area of on-chip memory. Note that search region pixel (15,2) of Portion #18 of FIG. 5b is stored to pixel (15,2) of the (17×21) search area of FIG. 6d, while search region pixel (15,22) of Portion #18 of FIG. 5b is stored to pixel (15,1) of the (17×21) search area of FIG. 6d. The left and right arrows in FIGS. 5b and 6d indicate the spatial relationships for the video signals of (1×21) Portion #18 between the (32×32) search region 16 of FIG. 5b and the (17×21) search area of FIG. 6d. Processing of each of Portions #18–32 comprises a single new comparisons.

Table VI shows the internal and external pointers corresponding to the single comparison performed after each of Portions #18–32 of FIG. 5b are transferred and stored from off-chip to on-chip memory.

TABLE VI

Internal and External Pointers for Comparisons for (1 × 16) Portions #18–32.

| PORTION | INTERNAL POINTERS | EXTERNAL POINTERS |
| --- | --- | --- |
| #18 | (15,7) | (15,7) |
| #19 | (14,7) | (14,7) |
| #20 | (13,7) | (13,7) |
| #21 | (12,7) | (12,7) |
| #22 | (11,7) | (11,7) |
| #23 | (10,7) | (10,7) |
| #24 | (9,7) | (9,7) |
| #25 | (8,7) | (8,7) |
| #26 | (7,7) | (7,7) |
| #27 | (6,7) | (6,7) |
| #28 | (5,7) | (5,7) |
| #29 | (4,7) | (4,7) |
| #30 | (3,7) | (3,7) |
| #31 | (2,7) | (2,7) |
| #32 | (1,7) | (1,7) |

Figures 6E, 6F:
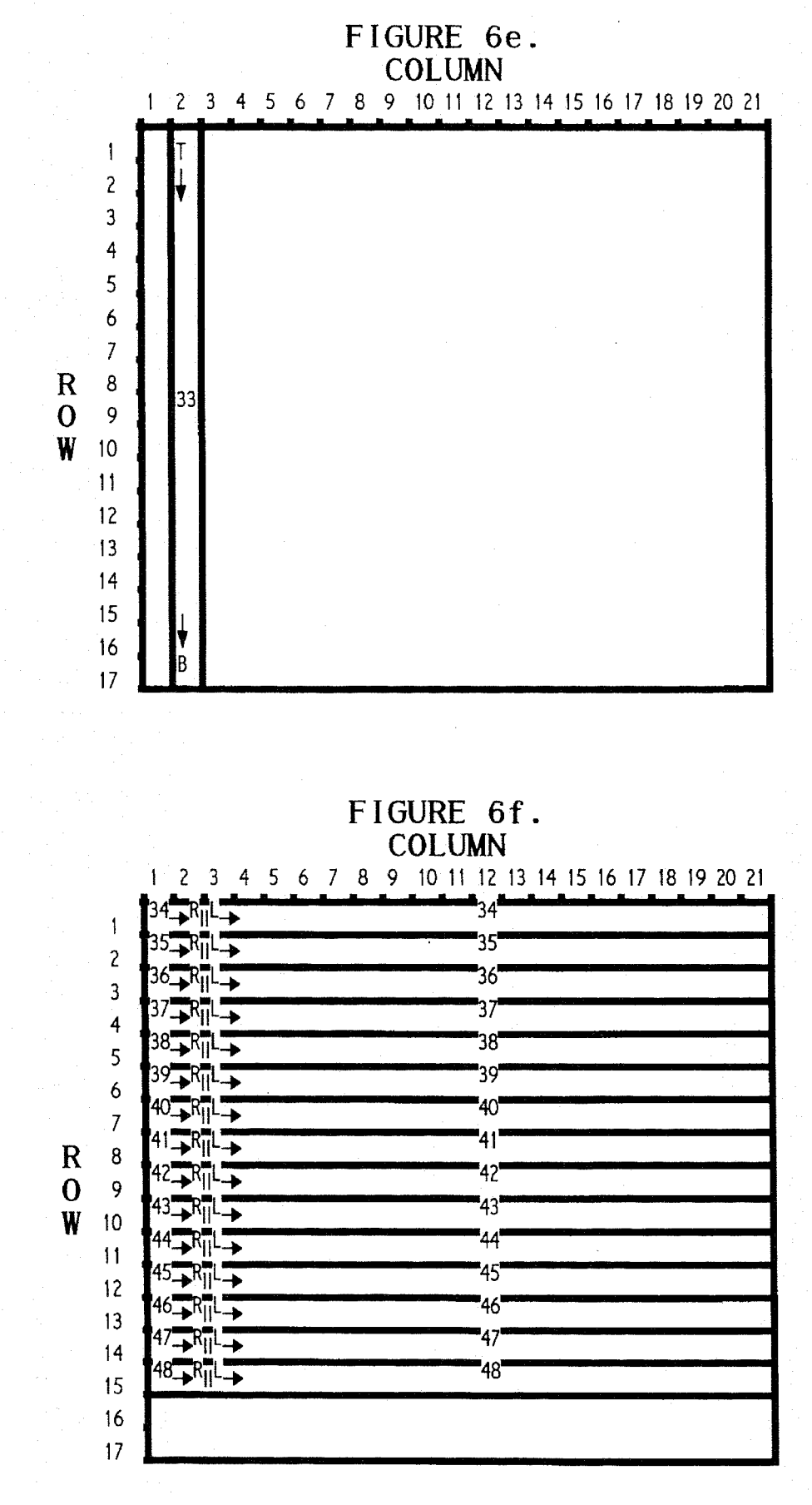
Figures 6G, 6H:
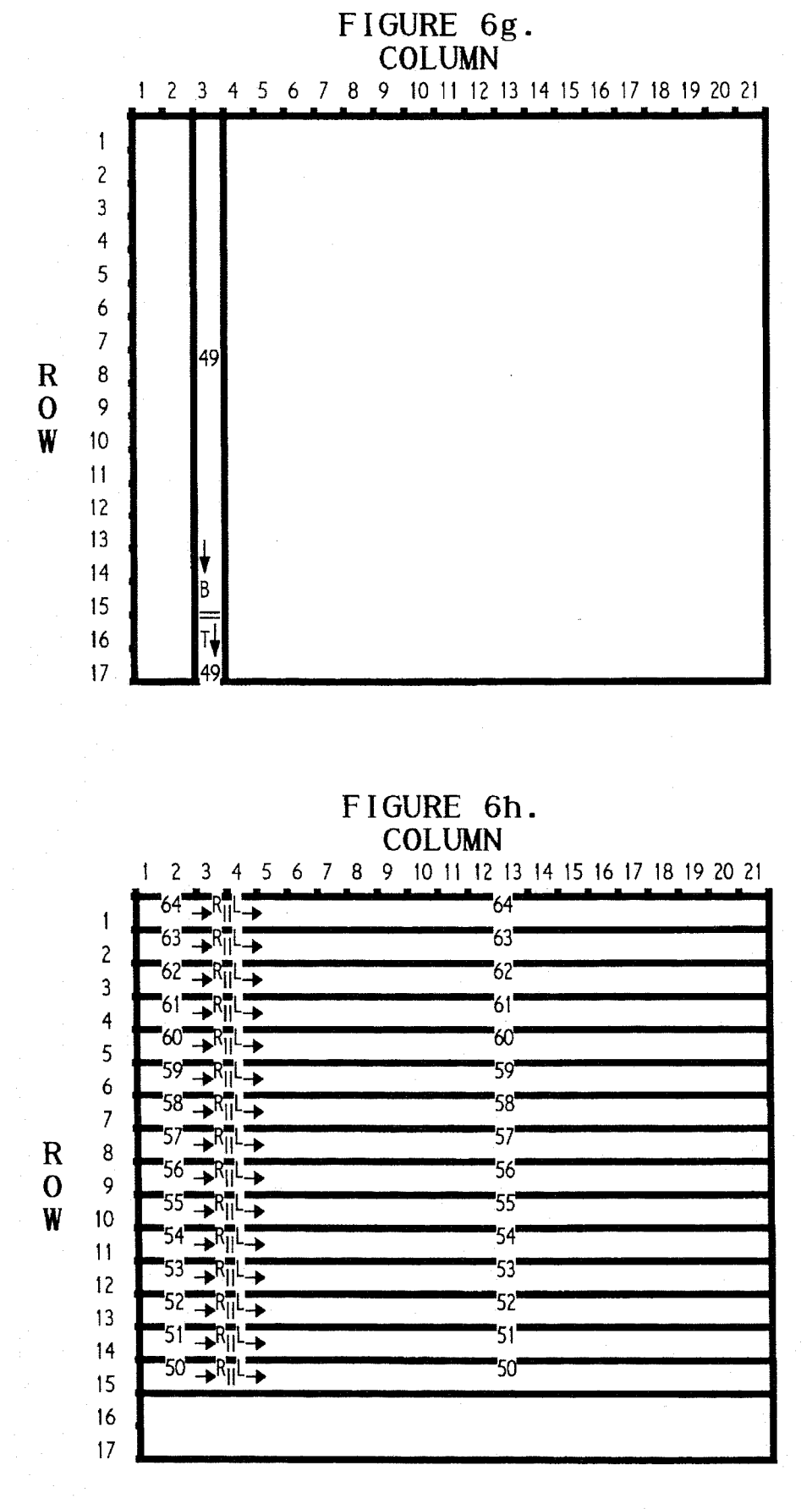
Figure 6I:
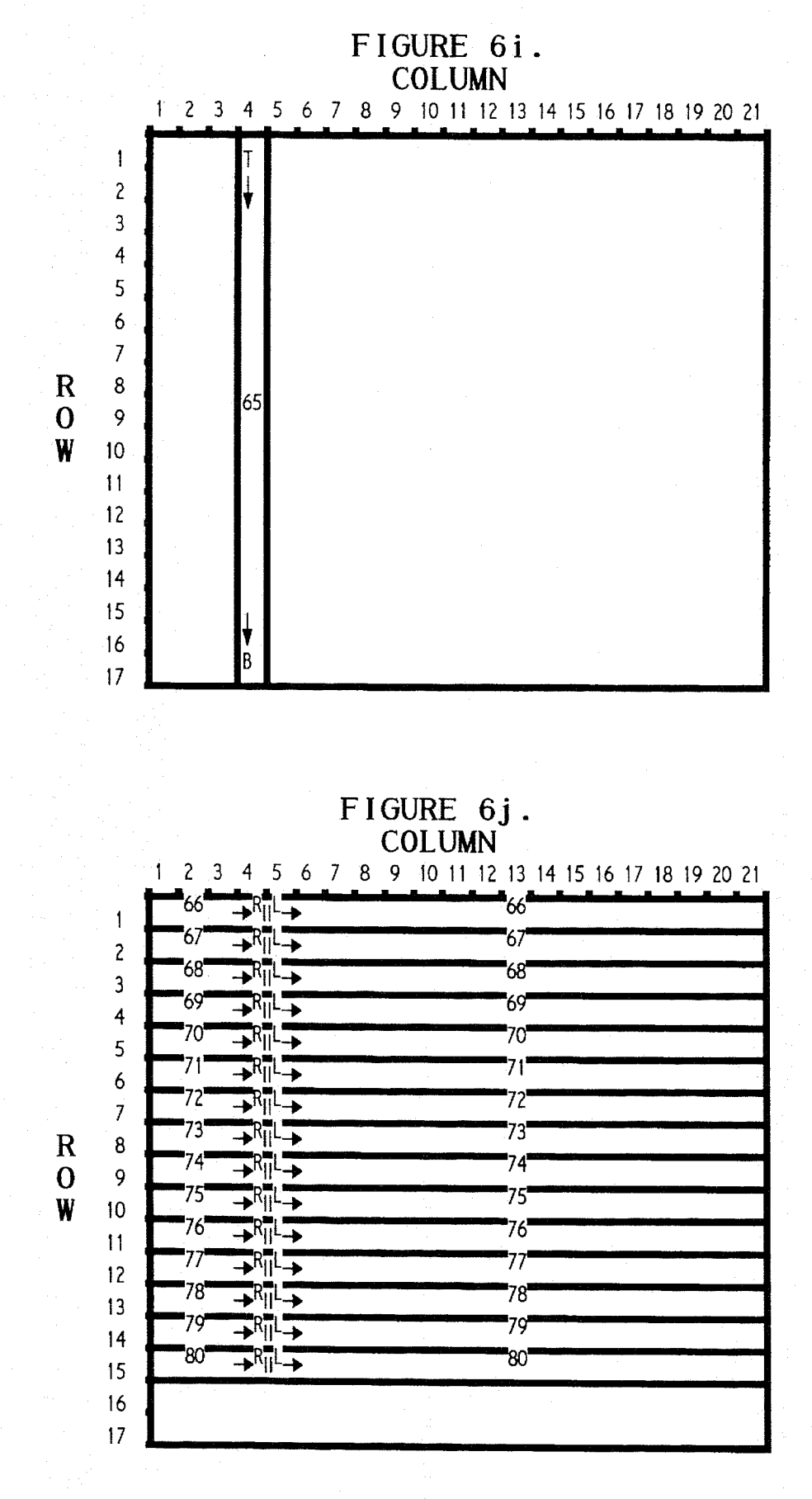
Figures 6K, 6L:
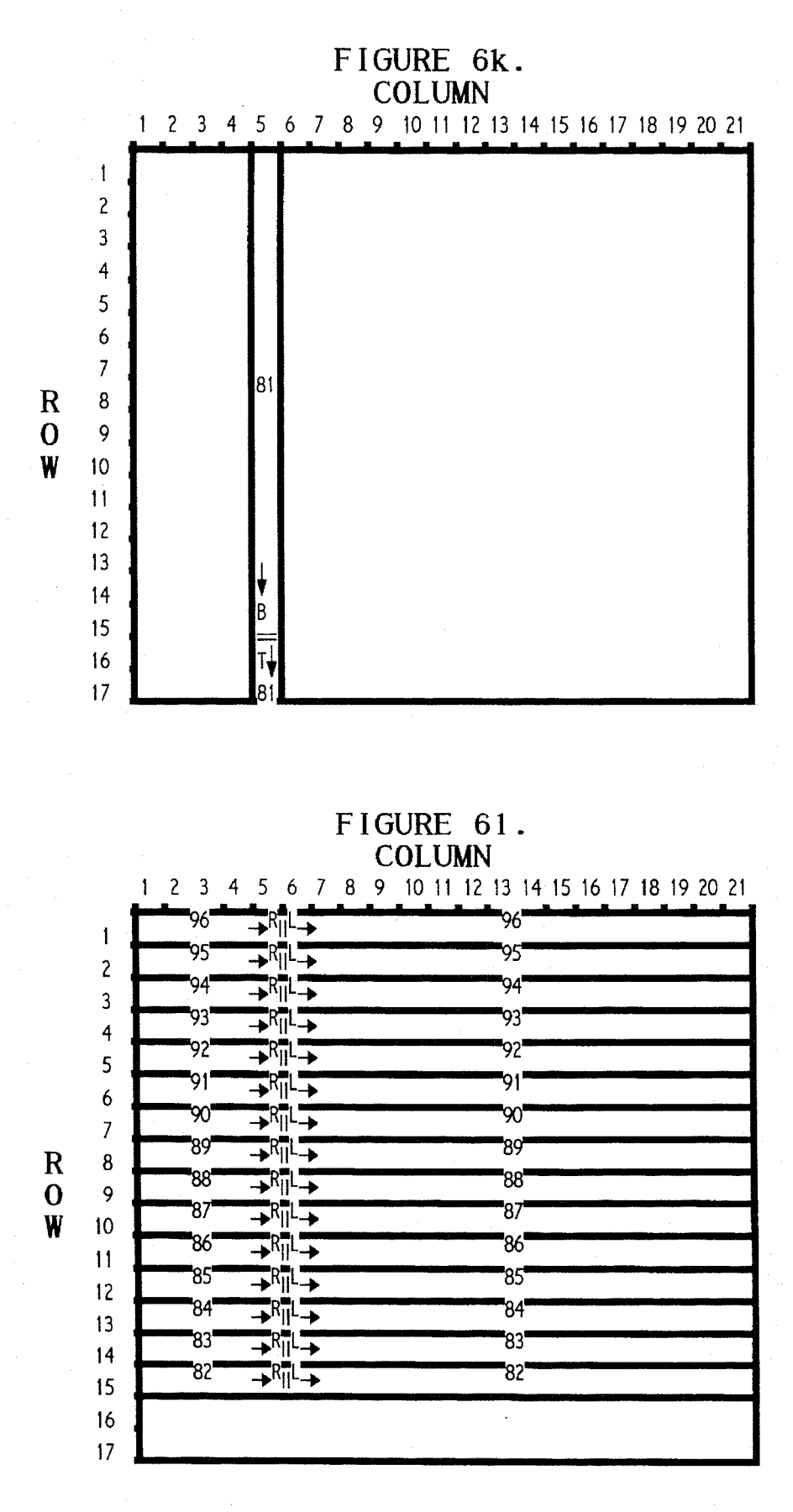
Figures 6M, 6N:
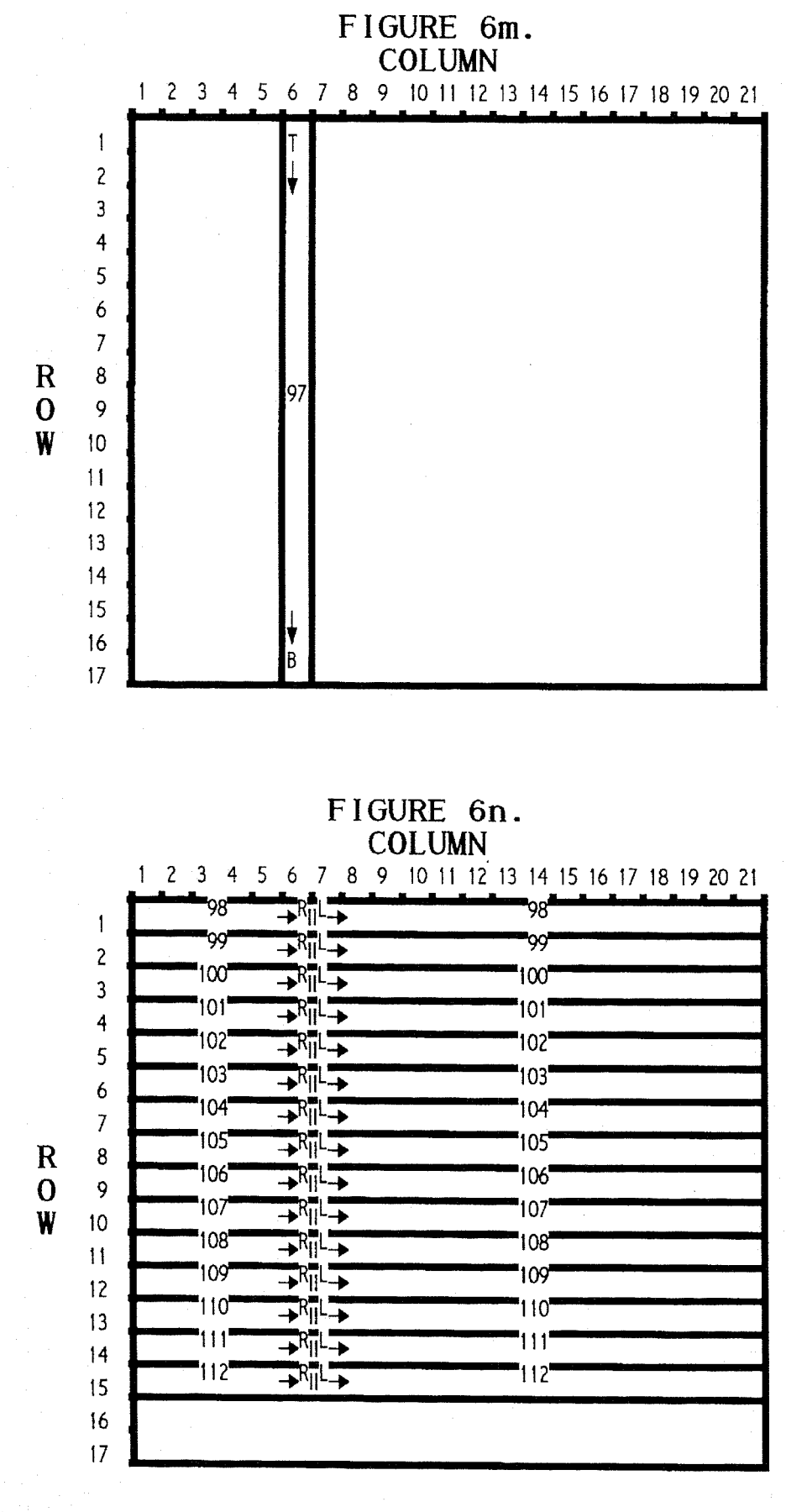
Figures 6O, 6P:
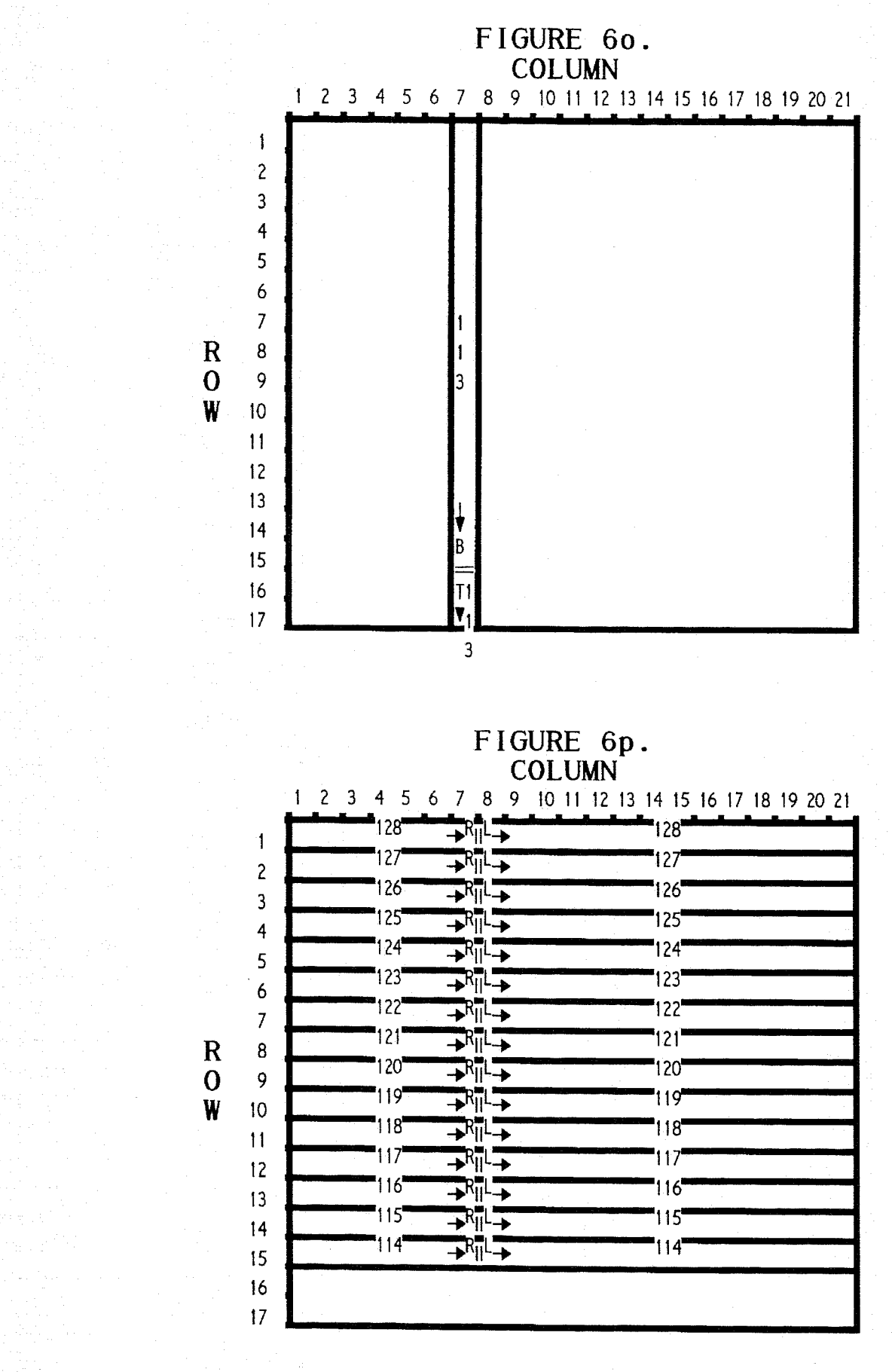
Figure 6Q:
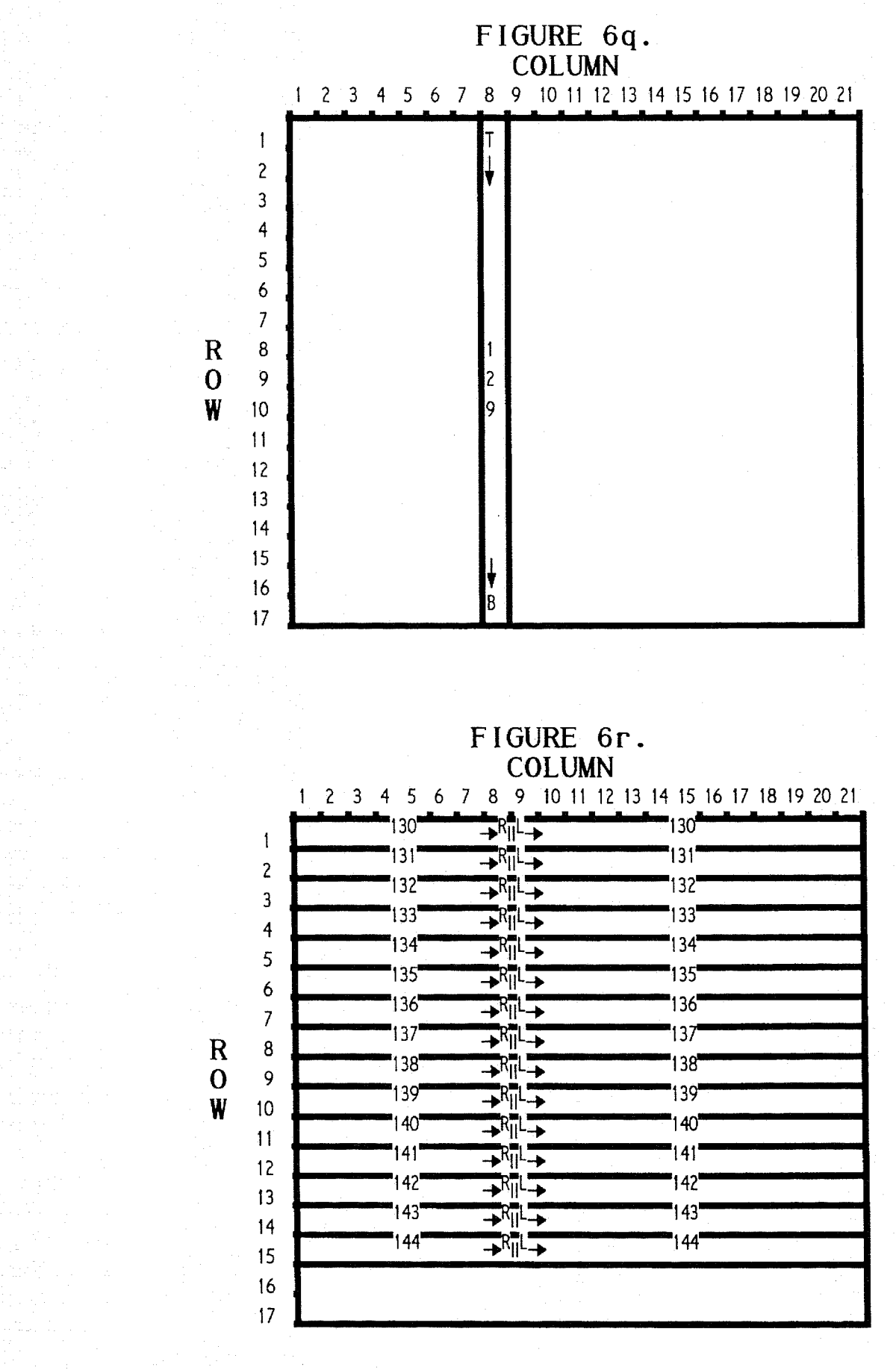
Figure 6S:
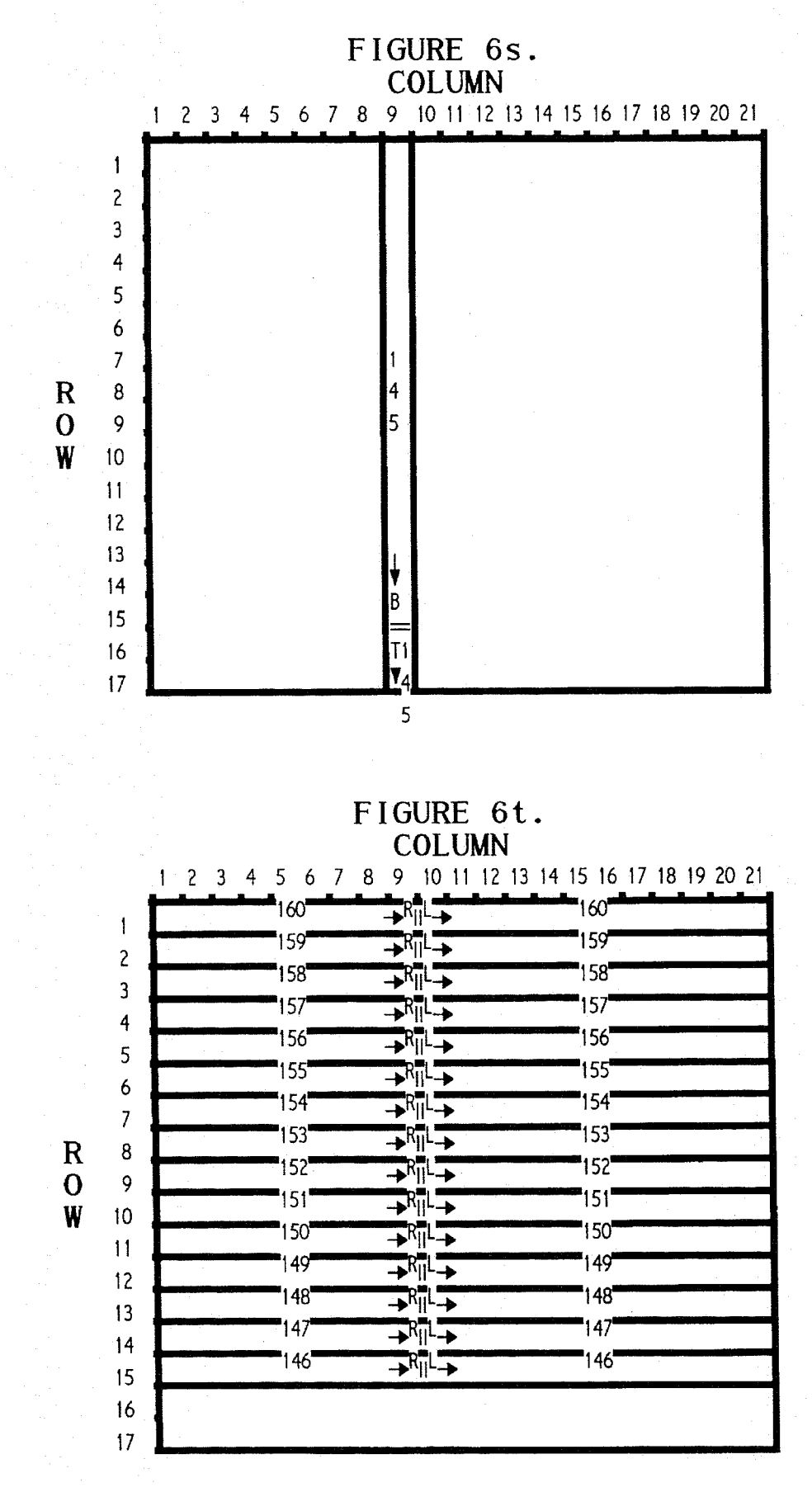
Figures 6U, 6V:
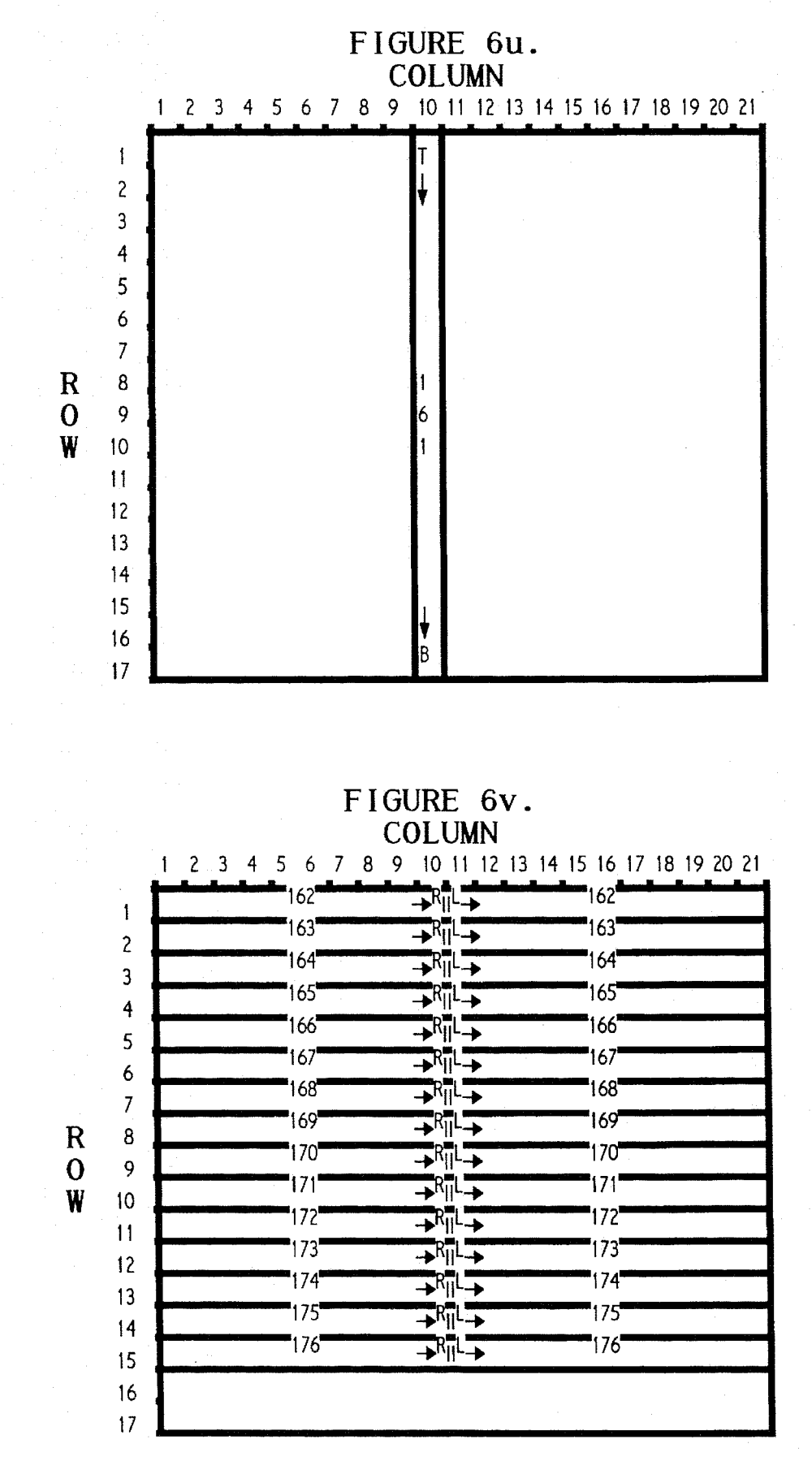
Figures 6W, 6X:
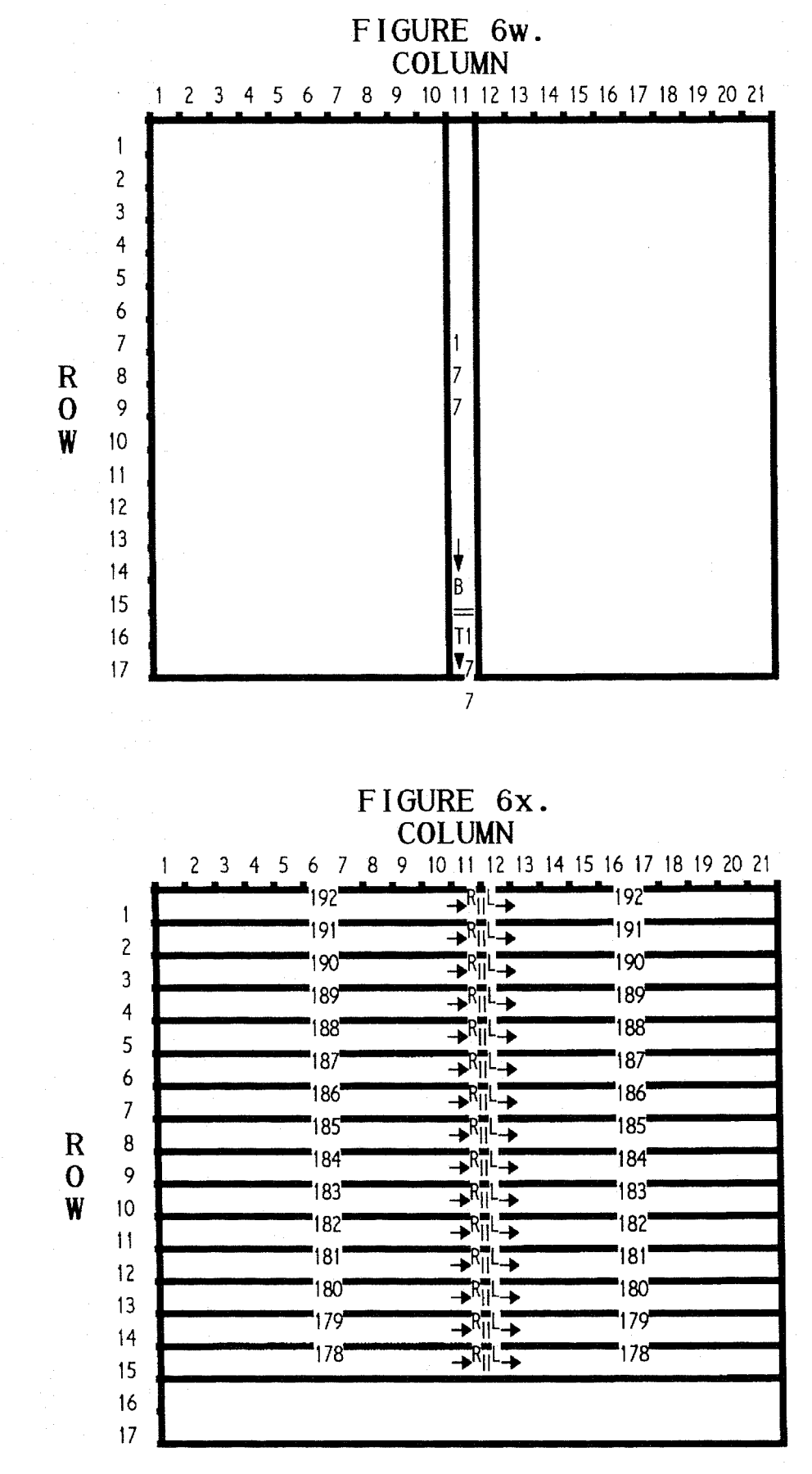

After Portion #32 is processed, the processing of steps 408 and 410 of FIG. 4 is then repeated for (17×1) Portion #33 of the (32×32) search region 16 of FIG. 5b. FIG. 6e shows where Portion #33 is stored in the (17×21) search area of on-chip memory. Processing of Portion #33 comprises two new comparisons.

Figure 13:
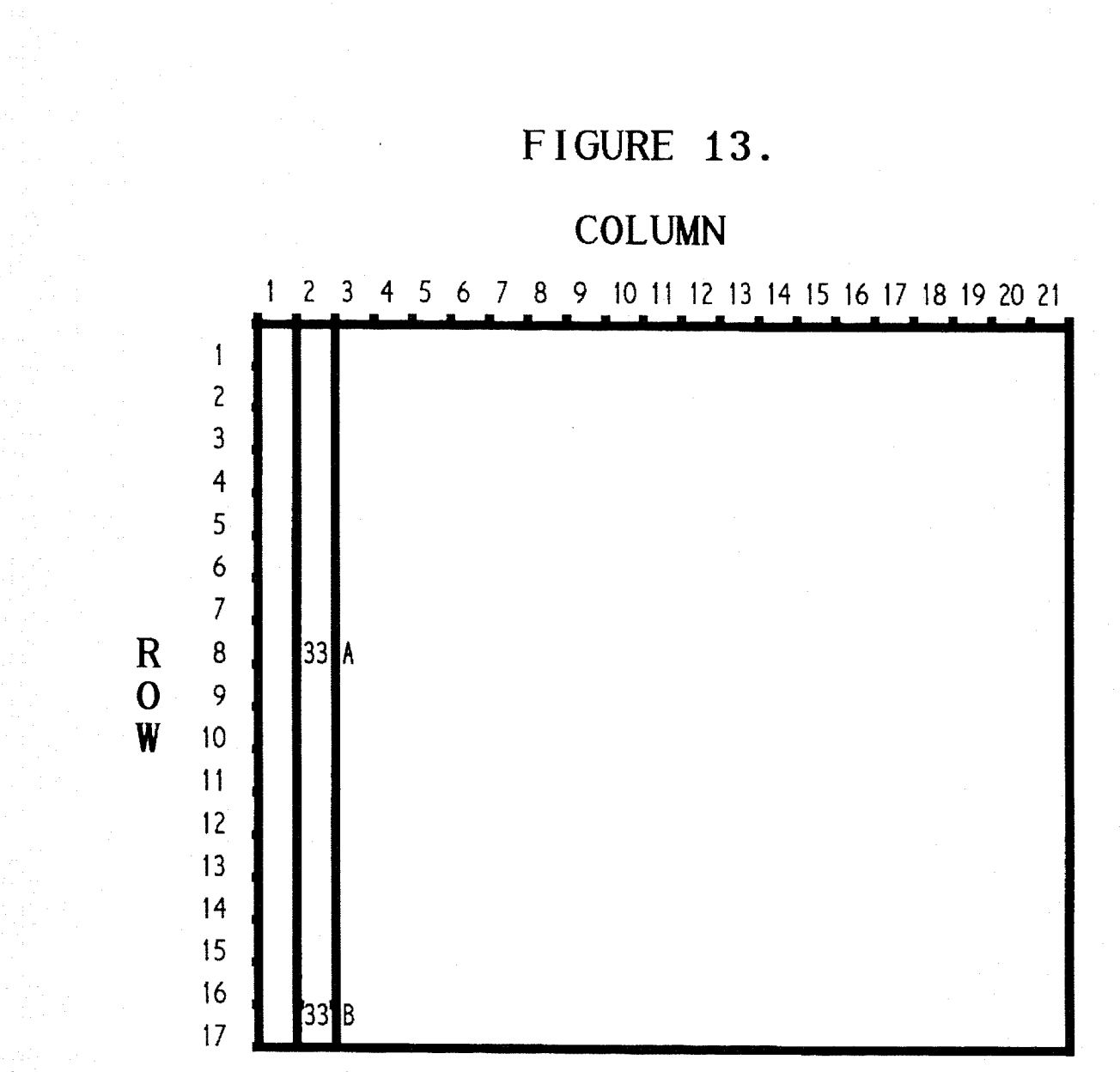

Referring now to FIG. 13, there is shown a graphical representation of the sequence of loading the video signals of (17×1) Portion #33 of the (32×32) search region 16 of FIG. 5b into the (17×21) search area of on-chip memory. (16×1) Section 33A of Portion #17 corresponds to the pixels in Column 23 and Rows 1–16 of the (32×32) search region 16 of FIG. 5b, where search region pixel (1,23) is loaded into pixel (1,2) of the (17×21) search area of FIG. 6e, while search region pixel (16×23) is loaded into pixel (16,2) of FIG. 6e. (1×1) Section 33B of Portion #33 corresponds to search region pixel (17,23) of FIG. 5b and is loaded into pixel (17,2) of the (17×21) search area of FIG. 6e.

Table VII shows the internal and external pointers corresponding to the two comparisons performed after Sections 33A and 33B of Portion #33 of FIG. 5b are transferred and stored from off-chip to on-chip memory.

TABLE VII

Internal and External Pointers for Comparisons for Sections 33A and 33B of (17 × 1) Portion #33.

| SECTION | INTERNAL POINTERS | EXTERNAL POINTERS |
|---|---|---|
| 33A | (1,8) | (1,8) |
| 33B | (2,8) | (2,8) |

After Portion #33 is processed, the processing of steps 408 and 410 of FIG. 4 is then repeated for Portions #34–192 of the (32×32) search region 16 of FIGS. 5b–5g. FIGS. 6f–6x show where Portions #34–192 are stored in the (17×21) search area of on-chip memory. Those skilled in the art will understand that Portions #34–192 are processed in a manner analogous to the processing of Portions #2–33, with internal and external pointers adjusted appropriately. Those skilled in the art will understand that the preferred storage scheme shown in FIGS. 6a–6x is used to maintain appropriate relative positioning of video signals within the search area of on-chip memory and to maintain uniform internal pointers for the video signals.

Figure 5G:
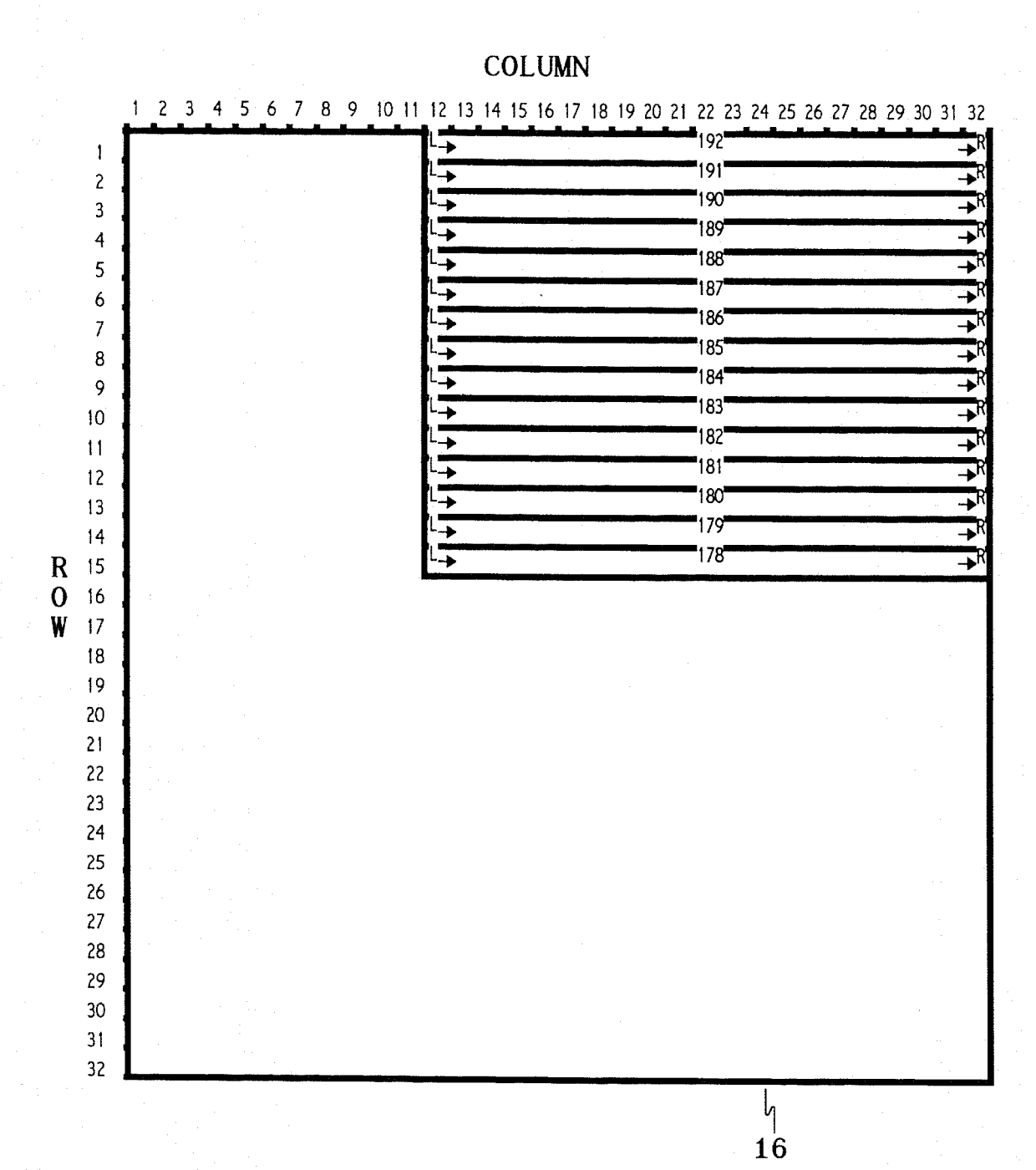

Referring again to FIG. 4, after processing Portion #192 of the (32×32) search region of FIG. 5g (as determined in step 412), all of the 289 possible comparisons using (16×16) blocks of video signals for the entire (32×32) search region will have been performed. At that juncture, the comparison of the (16×16) reference region to the (32×32) search region is complete and motion estimation processing preferably proceeds to encode the (16×16) reference region of the current frame using the motion vector for the (16×16) block of the (32×32) search region that best matches the (16×16) reference region (step 414). Those skilled in the art will understand that such encoding may involve generating pixel differences between the two (16×16) regions.

Those skilled in the art will understand that the motion estimation processing of FIGS. 4, 7, and 9 involves minimal signal transfer when using a search area of on-chip memory that is smaller than the search area of the previous frame.

Figure 14:
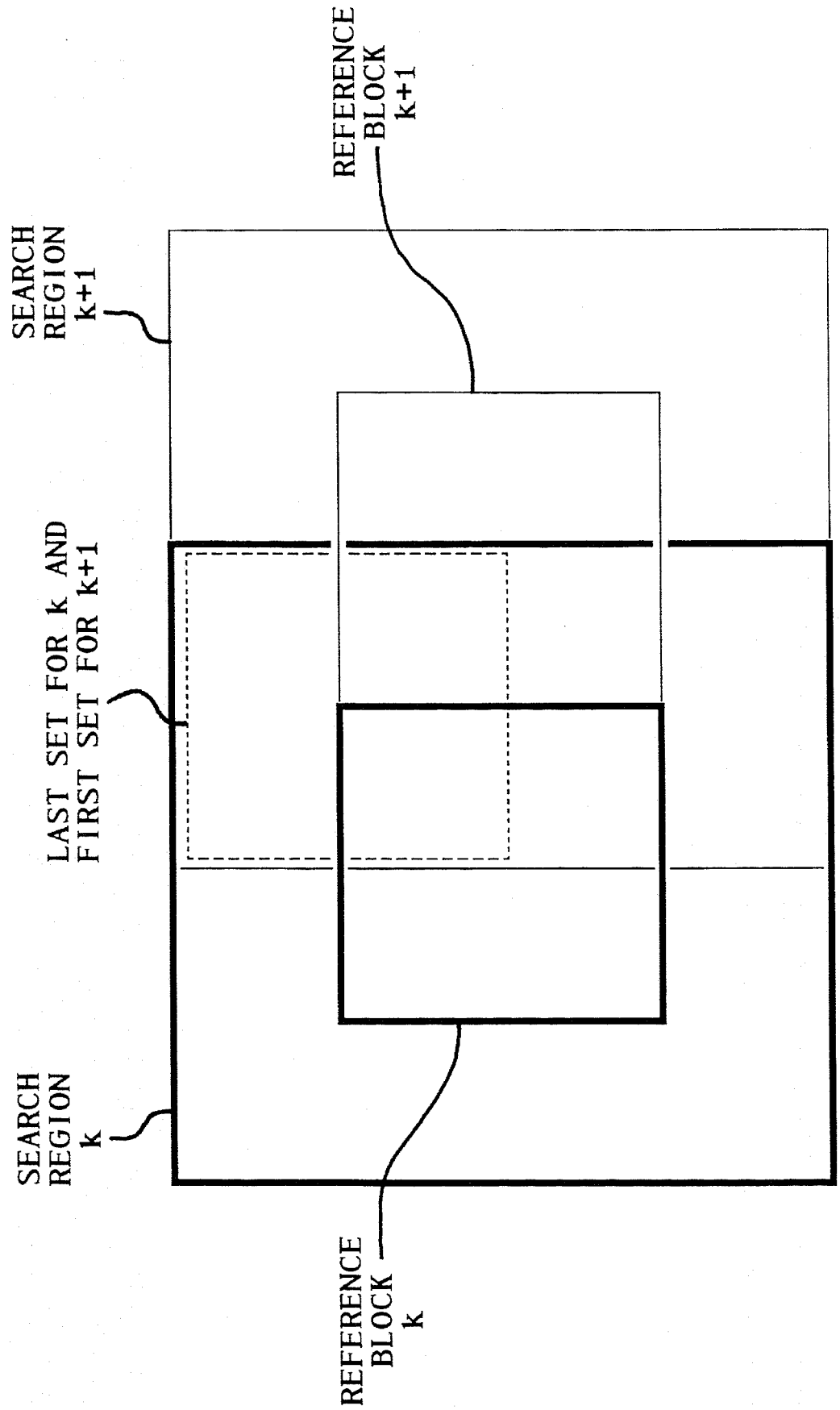
FIG. 14 is a graphical representation of the search areas i and i+1 of a previous frame for two horizontally adjacent (16×16) reference blocks i and i+1 of a current frame.

Referring now to FIG. 14, there is shown a graphical representation of the search areas k and k+1 of a previous frame for two horizontally adjacent (16×16) reference blocks k and k+1 of a current frame. As shown in FIG. 14, when reference blocks for motion estimation are selected using a raster scan sequence, some of the video signals stored the search area of on-chip memory at the end of motion estimation processing for reference block k are the same video signals to be used at the beginning of motion estimation processing for reference block k+1.

It will be understood, therefore, that additional signal transfer savings may be gained by not refilling the (17×21) search area of on-chip memory at the start of motion estimation processing for a reference block if the previous reference block was horizontally adjacent. It will also be understood that, depending upon the size of the on-chip search area, additional signal transfer savings may be gained by selecting reference blocks in a zig-zag raster scan sequence (e.g., left to right for even rows of reference blocks and right to left for odd rows of reference blocks).

Figure 15:
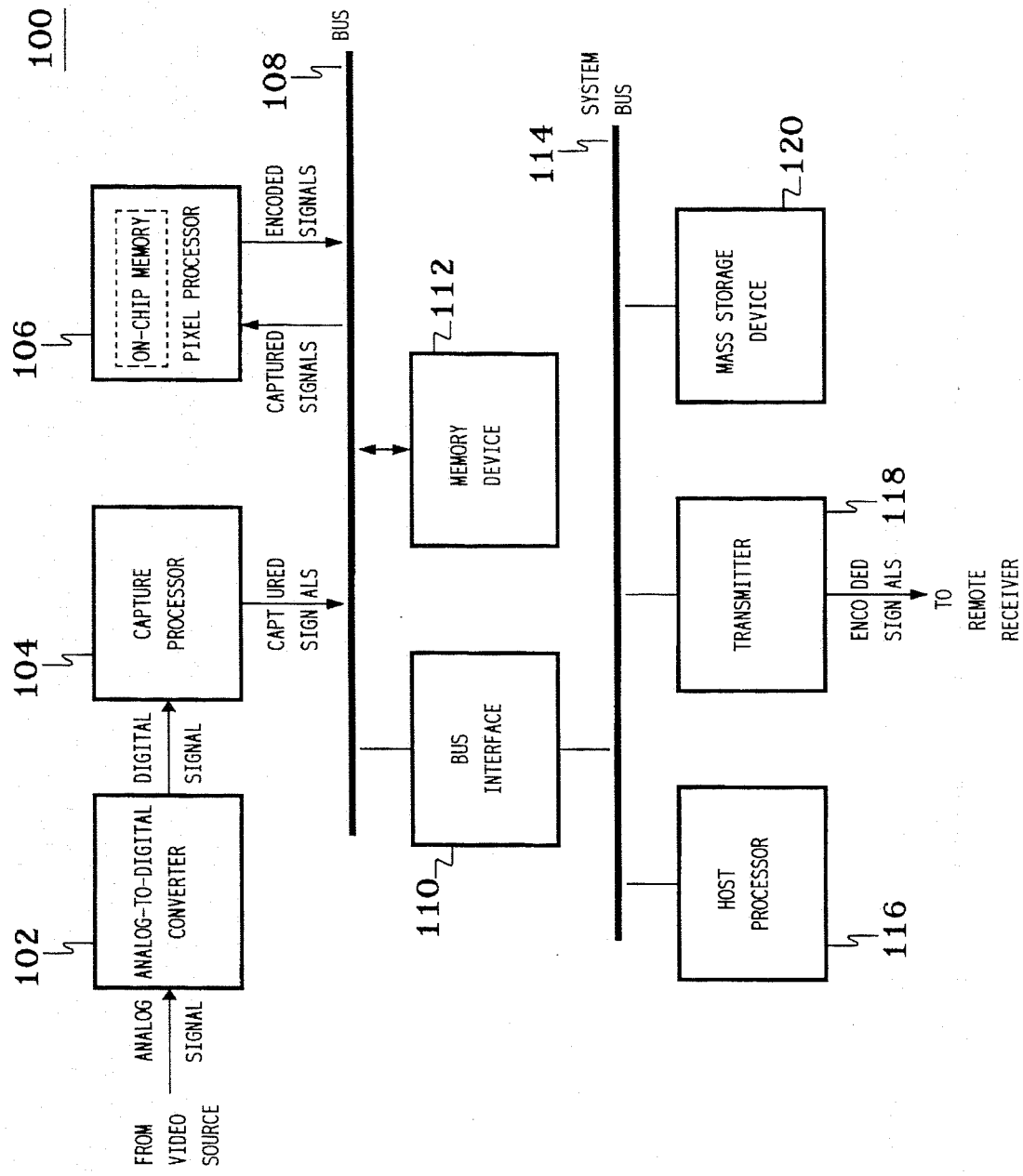
FIG. 15 is a block diagram of a video processing system for implementing the motion estimation processing of FIGS. 4, 7, and 9.

Referring now to FIG. 15, there is shown a block diagram of a video processing system 100 for implementing the motion estimation processing of FIGS. 4, 7, and 9, according to a preferred embodiment of the present invention. Analog-to-digital (A/D) converter 102 of video processing system 100 receives analog video signals from a video source. The video source may be any suitable source of analog video signals such as a video camera or VCR for generating local analog video signals or a video cable or antenna for receiving analog video signals from a remote source. A/D converter 102 decodes (i.e., separates the signal into constituent components) and digitizes the analog video signals into digital video component signals (e.g., in a preferred embodiment, Y, U, and V component signals).

Capture processor 104 receives, captures, and stores the digitized component signals as subsampled video frames in memory device 112 via bus 108. Each subsampled video frame is represented by a set of two-dimensional component planes or pixel bitmaps, one for each component of the digitized video signals. In a preferred embodiment, capture processor 104 captures video signals in a YUV9 format, in which every (4×4) block of pixels of the Y component plane corresponds to a single pixel in the U component plane and a single pixel in the V component plane.

Pixel processor 106 accesses the captured bitmaps from memory device 112 via bus 108 and generates encoded video signals that represent the captured video signals. Depending upon the particular encoding algorithm implemented, pixel processor 106 applies a sequence of compression techniques to reduce the amount of data used to represent in the information in the video signals. In a preferred embodiment of the present invention, pixel processor 106, which comprises on-chip memory, implements the motion estimation processing of FIGS. 4, 7, and 9. The encoded video signals may then be stored to (off-chip) memory device 112 via bus 108 for eventual transmission to host processor 116 via bus 108, bus interface 110, and system bus 114.

Host processor 116 may transmit the encoded video signals to transmitter 118 for real-time transmission to a remote receiver (not shown in FIG. 15), store the encoded video signals to mass storage device 120 for future processing, or both.

Video processing system 100 is preferably a general microprocessor-based personal computer (PC) system with a special purpose video-processing plug-in board. In particular, A/D converter 102 may be any suitable converter for decoding and digitizing analog video signals. Capture processor 104 may be any suitable processor for capturing digitized video component signals as subsampled frames. Pixel processor 106 may be any suitable processor with on-chip memory for encoding subsampled video signals, such as an Intel®i750® pixel processor. Memory device 112 may be any suitable computer memory device, such as a video random access memory (VRAM) or dynamic RAM (DRAM) device. Bus 108 may be any suitable digital signal transfer device and is preferably an Industry Standard Architecture (ISA) bus or Extended ISA (EISA) bus. Bus interface 110 may be any suitable device for interfacing between bus 108 and system bus 114. In a preferred embodiment, A/D converter 102, capture processor 104, pixel processor 106, bus 108, bus interface 110, and memory device 112 are contained in a single plug-in board, such as an Intel®ActionMedia®-II board, capable of being added to a general microprocessor-based personal computer (PC) system.

Host processor 116 may be any suitable processor for controlling the operations of the special-purpose video processing board and is preferably an Intel® general purpose microprocessor such as an Intel®i386™, i486™, or Pentium™ processor. System bus 114 may be any suitable digital signal transfer device and is preferably an ISA bus or EISA bus. Mass storage device 120 may be any suitable device for storing digital signals and is preferably a computer hard drive. Transmitter 118 may be any suitable device for transmitting digital signals to a remote receiver. Those skilled in the art will understand that the encoded video signals may be transmitted using any suitable means of transmission such as telephone line, RF antenna, local area network, or remote area network. In an alternative preferred embodiment, transmitter 118 may be connected directly to bus 108 rather than to system bus 114.

Those skilled in the art will understand that the present invention provides motion estimation processing with reduced on-chip memory usage, reduced signal transfer, and more uniform signal transfer.

It will also be understood that processing sequences other than the sequences shown in FIGS. 5a–5g, 6a–6x, 8, and 10–13 fall within the scope of the present invention.

It will be further understood that dimensions of the various subimages and memory areas other than those described above in the context of FIGS. 4, 7, and 9 fall within the scope of the present invention. In general, reference blocks in current frames may be of dimension (r×s), search regions of previous frames may be of dimension (m×n), and search areas of on-chip memory may be of dimension (p×q), where:

o r is preferably less than or equal to p;
o s is preferably less than or equal to q;
o p is preferably less than or equal to m; and
o q is preferably less than or equal to n.

The internal row and column pointers ($R_i$ and $C_i$), which correspond to the on-chip search area, range from 1 to p and from 1 to q, respectively. Similarly, the external row and column pointers ($R_e$ and $C_e$), which correspond to the off-chip search region, range from 1 to m and from 1 to n, respectively. The internal and external pointers are preferably related by the following modulo equations:

$$R_i = R_e \, MOD \, p \tag{2}$$

and $$C_i = C_e \, MOD \, q \tag{3}$$

It will be further understood that the present invention may be used to perform non-exhaustive motion estimation, in which a subset of all of the possible comparisons between the reference block and the search region is performed.

It will also be understood that the present invention may be used for either integer or fractional pixel motion estimation schemes. For example, an integer pixel motion estimation search may be performed for the entire search range and then, for the best match, a local search may be performed using fractional pixel motion estimation. This fractional pixel motion estimation may be accomplished with software interpolation if the number of positions examined is relatively small or hardware may be added to the chip to perform the interpolation and generate the best match.

In the case where integer pixel motion estimation generates two best matches, fractional pixel motion estimation may be performed around each best match.

For fractional pixel motion estimation, linear interpolation of pixel values to intermediate positions may be used for computational simplicity. Higher-order interpolation schemes based, for example, on cubic or spline interpolation may be performed if there is sufficient processing bandwidth.

Those skilled in the art will also understand that the present invention may be used for other computer processes that use two-dimensional caching, other than the motion estimation processing of FIGS. 4, 7, and 9.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for two-dimensional caching, comprising the steps of:

(a) storing signals corresponding to an (p×q) first portion of a (m×n) region in an (p×q) area of the computer memory, wherein:
p is less than or equal to m; and
q is less than or equal to n;

(b) processing the signals in the (p×q) area using a processor;

(c) storing signals corresponding to a next portion of the (m×n) region in the (p×q) area by overwriting a subset of the signals in the (p×q) area, wherein the next portion of the (m×n) region is smaller than the (p×q) first portion of the region;

(d) repeating step (b);

(e) repeating steps (c) and (d) to complete the processing of the signals of the (m×n) region.

2. The process of claim 1, wherein steps (a) and (b) comprise the steps of:

(1) storing signals corresponding to an (r×s) first section of the (p×q) first portion of the (m×n) region in the (p×q) area of the computer memory, wherein:
r is less than or equal to p; and
s is less than or equal to q;

(2) processing the signals of the (r×s) first section using the processor;

(3) storing additional signals corresponding to the (p×q) first portion of the (m×n) region in the (p×q) area of the computer memory;

(4) processing the signals of an (r×s) next section of the (p×q) first portion of the (m×n) region using the processor, wherein the (r×s) next section comprises the additional signals of step (3); and (5) repeating steps (3) and (4) to complete the processing of the signals of the (p×q) first portion of the (m×n) region.

3. The process of claim 2, wherein steps (c) and (d) comprise the steps of:

(A) storing signals corresponding to an (r×s) first section of the (p×q) next portion of the (m×n) region in the (p×q) area of the computer memory, wherein:
r is less than or equal to p; and
s is less than or equal to q;

(B) processing the signals of the (r×s) first section using the processor;

(C) storing additional signals corresponding to the (p×q) next portion of the (m×n) region in the (p×q) area of the computer memory; and (D) processing the signals of an (r×s) next section of the (p×q) next portion of the (m×n) region using the processor, wherein the (r×s) next section comprises the additional signals of step (C).

4. The process of claim 1, wherein steps (c) and (d) comprise the steps of:

(1) storing signals corresponding to an (r×s) first section of the (p×q) next portion of the (m×n) region in the (p×q) area of the computer memory, wherein:

r is less than or equal to p; and s is less than or equal to q;

(2) processing the signals of the (r×s) first section using the processor;

(3) storing additional signals corresponding to the (p×q) next portion of the (m×n) region in the (p×q) area of the computer memory; and (4) processing the signals of an (r×s) next section of the (p×q) next portion of the (m×n) region using the processor, wherein the (r×s) next section comprises the additional signals of step (3).

5. The process of claim 1, wherein:

the signals comprise video signals;

the (m×n) region comprises a (m×n) search region of a previous frame;

the processing of steps (b) and (d) comprises comparing video signals corresponding to an (r×s) reference block of a current image to the video signals corresponding to the search region using the processor.

6. An apparatus for two-dimensional caching, comprising:

(a) a computer memory; and (b) a processor, wherein:

signals corresponding to an (p×q) first portion of a (m×n) region are stored in an (p×q) area of the computer memory, wherein:

p is less than or equal to m; and q is less than or equal to n;

the processor processes the signals in the (p×q) area;

signals corresponding to a next portion of the (m×n) region are stored in the (p×q) area by overwriting a subset of the signals in the (p×q) area, wherein the next portion of the (m×n) region is smaller than the (p×q) first portion of the region; and the processor processes the signals in the (p×q) area that correspond to the next portion of the (m×n) region.

7. The apparatus of claim 1, wherein:

signals corresponding to an (r×s) first section of the (p×q) first portion of the (m×n) region are stored in the (p×q) area of the computer memory, wherein:

r is less than or equal to p; and s is less than or equal to q;

the processor processes the signals of the (r×s) first section;

additional signals corresponding to the (p×q) first portion of the (m×n) region are stored in the (p×q) area of the computer memory; and the processor processes the signals of an (r×s) next section of the (p×q) first portion of the (m×n) region, wherein the (r×s) next section comprises the additional signals.

8. The apparatus of claim 7, wherein:

signals corresponding to an (r×s) first section of the (p×q) next portion of the (m×n) region are stored in the (p×q) area of the computer memory, wherein:

r is less than or equal to p; and s is less than or equal to q;

the processor processes the signals of the (r×s) first section;

additional signals corresponding to the (p×q) next portion of the (m×n) region are stored in the (p×q) area of the computer memory; and the processor processes the signals of an (r×s) next section of the (p×q) next portion of the (m×n) region, wherein the (r×s) next section comprises the additional signals.

9. The apparatus of claim 6, wherein:

signals corresponding to an (r×s) first section of the (p×q) next portion of the (m×n) region are stored in the (p×q) area of the computer memory, wherein:

r is less than or equal to p; and s is less than or equal to q;

the processor processes the signals of the (r×s) first section;

additional signals corresponding to the (p×q) next portion of the (m×n) region are stored in the (p×q) area of the computer memory; and the processor processes the signals of an (r×s) next section of the (p×q) next portion of the (m×n) region, wherein the (r×s) next section comprises the additional signals.

10. The apparatus of claim 6, wherein on-chip memory of the processor comprises the computer memory.

11. The apparatus of claim 6, wherein:

the signals comprise video signals;

the (m×n) region comprises a (m×n) search region of a previous frame;

the processor compares video signals corresponding to an (r×s) reference block of a current image to the video signals corresponding to the search region.

12. A system for two-dimensional caching, comprising:

(a) an external memory device; and (b) a processor having on-chip memory, wherein:

signals corresponding to an (p×q) first portion of a (m×n) region are transmitted from the external memory device and stored in an (p×q) area of the on-chip memory, wherein:

p is less than or equal to m; and q is less than or equal to n;

the processor processes the signals in the (p×q) area;

signals corresponding to a next portion of the (m×n) region are transmitted from the external memory device and stored in the (p×q) area by overwriting a subset of the signals in the (p×q) area, wherein the next portion of the (m×n) region is smaller than the (p×q) first portion of the region; and the processor processes the signals in the (p×q) area that correspond to the next portion of the (m×n) region.

13. The system of claim 12, wherein:

signals corresponding to an (r×s) first section of the (p×q) first portion of the (m×n) region are transmitted from the external memory device and stored in the (p×q) area of the on-chip memory, wherein:

r is less than or equal to p; and s is less than or equal to q;

the processor processes the signals of the (r×s) first section;

additional signals corresponding to the (p×q) first portion of the (m×n) region are transmitted from the external memory device and stored in the (p×q) area of the on-chip memory; and the processor processes the signals of an (r×s) next section of the (p×q) first portion of the (m×n) region, wherein the (r×s) next section comprises the additional signals.

14. The system of claim 13, wherein:

signals corresponding to an (r×s) first section of the (p×q) next portion of the (m×n) region are transmitted from the external memory device and stored in the (p×q) area of the on-chip memory, wherein:

r is less than or equal to p; and s is less than or equal to q;

the processor processes the signals of the (r×s) first section;

additional signals corresponding to the (p×q) next portion of the (m×n) region are transmitted from the external memory device and stored in the (p×q) area of the on-chip memory; and the processor processes the signals of an (r×s) next section of the (p×q) next portion of the (m×n) region, wherein the (r×s) next section comprises the additional signals.

15. The system of claim 12, wherein:

signals corresponding to an (r×s) first section of the (p×q) next portion of the (m×n) region are transmitted from the external memory device and stored in the (p×q) area of the on-chip memory, wherein:

r is less than or equal to p; and s is less than or equal to q;

the processor processes the signals of the (r×s) first section;

additional signals corresponding to the (p×q) next portion of the (m×n) region are transmitted from the external memory device and stored in the (p×q) area of the on-chip memory; and the processor processes the signals of an (r×s) next section of the (p×q) next portion of the (m×n) region, wherein the (r×s) next section comprises the additional signals.

16. The system of claim 12, wherein:

the signals comprise video signals;

the (m×n) region comprises a (m×n) search region of a previous frame;

the processor compares video signals corresponding to an (r×s) reference block of a current image to the video signals corresponding to the search region.

17. A computer-implemented process for processing video signals, comprising the steps of:

(a) storing video signals corresponding to an (p×q) first portion of a (m×n) search region of a previous frame in an (p×q) search area of a computer memory, wherein:

p is less than or equal to m; and q is less than or equal to n;

(b) comparing video signals corresponding to an (r×s) reference block of a current image to the video signals in the search area using a processor, wherein:

r is less than or equal to p; and s is less than or equal to q;

(c) storing video signals corresponding to a next portion of the search region in the search area by overwriting a subset of the video signals in the search area, wherein the next portion of the search region is smaller than the first portion of the search region;

(d) repeating step (b);

(e) repeating steps (c) and (d) to complete the comparison of the video signals of the (r×s) reference block to the video signals of the (m×n) search region; and (f) selecting a motion vector in accordance with the comparisons of steps (b) and (d) using the processor.

18. The process of claim 17, wherein step (a) further comprises the step of storing the video signals corresponding to the (r×s) reference block of the current image in an (r×s) reference area of the computer memory.

19. The process of claim 17, further comprising the step of encoding the video signals in accordance with the selected motion vector using the processor.

20. The process of claim 17, wherein steps (a) and (b) comprise the steps of:

(1) storing video signals corresponding to an (r×s) first section of the first portion of the search region in the search area of the computer memory;

(2) comparing the video signals of the (r×s) first section to the video signals of the (r×s) reference block using the processor;

(3) storing additional video signals corresponding to the first portion of the search region in the search area of the computer memory;

(4) comparing the video signals of an (r×s) next section of the first portion of the search region to the video signals of the (r×s) reference block using the processor, wherein the (r×s) next section comprises the additional video signals of step (3); and (5) repeating steps (3) and (4) to complete the comparison of the video signals of the (r×s) reference block to the video signals of the (p×q) first portion of the (m×n) search region.

21. The process of claim 20, further comprising the step of encoding the video signals in accordance with the selected motion vector using the processor, wherein:

step (a) further comprises the step of storing the video signals corresponding to the (r×s) reference block of the current image in an (r×s) reference area of a computer memory;

steps (c) and (d) comprise the steps of:

(A) storing video signals corresponding to an (r×s) first section of the next portion of the search region in the search area of the computer memory;

(B) comparing the video signals of the (r×s) first section to the video signals of the (r×s) reference block using the processor;

(C) storing additional video signals corresponding to the next portion of the search region in the search area of the computer memory; and (D) comparing the video signals of an (r×s) next section of the next portion of the search region to the video signals of the (r×s) reference block using the processor, wherein the (r×s) next section comprises the additional video signals of step (C).

22. The process of claim 17, wherein steps (c) and (d) comprise the steps of:

(1) storing video signals corresponding to an (r×s) first section of the next portion of the search region in the search area of the computer memory;

(2) comparing the video signals of the (r×s) first section to the video signals of the (r×s) reference block using the processor;

(3) storing additional video signals corresponding to the next portion of the search region in the search area of the computer memory; and (4) comparing the video signals of an (r×s) next section of the next portion of the search region to the video signals of the (r×s) reference block using the processor, wherein the (r×s) next section comprises the additional video signals of step (3).

23. An apparatus for processing video signals, comprising:

(a) a computer memory; and (b) a processor, wherein:

video signals corresponding to an (p×q) first portion of a (m×n) search region of a previous frame are stored in an (p×q) search area of the computer memory, wherein:

p is less than or equal to m; and q is less than or equal to n;

the processor compares video signals corresponding to an (r×s) reference block of a current image to the video signals in the search area, wherein:

r is less than or equal to p; and s is less than or equal to q;

video signals corresponding to a next portion of the search region are stored in the search area by overwriting a subset of the video signals in the search area, wherein the next portion of the search region is smaller than the first portion of the search region;

the processor compares video signals corresponding to an (r×s) reference block of a current image to the video signals in the search area;

the processor selects a motion vector in accordance with the comparisons.

24. The apparatus of claim 23, wherein the video signals corresponding to the (r×s) reference block of the current image are stored in an (r×s) reference area of the computer memory.

25. The apparatus of claim 23, wherein the processor encodes the video signals in accordance with the selected motion vector.

26. The apparatus of claim 23, wherein:
video signals corresponding to an (r×s) first section of the first portion of the search region are stored in the search area of the computer memory;
the processor compares the video signals of the (r×s) first section to the video signals of the (r×s) reference block;
additional video signals corresponding to the first portion of the search region are stored in the search area of the computer memory; and
the processor compares the video signals of an (r×s) next section of the first portion of the search region to the video signals of the (r×s) reference block, wherein the (r×s) next section comprises the additional video signals.

27. The apparatus of claim 26, wherein:
the video signals corresponding to the (r×s) reference block of the current image are stored in an (r×s) reference area of the computer memory;
video signals corresponding to an (r×s) first section of the next portion of the search region are stored in the search area of the computer memory;
the processor compares the video signals of the (r×s) first section to the video signals of the (r×s) reference block;
additional video signals corresponding to the next portion of the search region are stored in the search area of the computer memory;
the processor compares the video signals of an (r×s) next section of the next portion of the search region to the video signals of the (r×s) reference block, wherein the (r×s) next section comprises the additional video signals; and
the processor encodes the video signals in accordance with the selected motion vector.

28. The apparatus of claim 23, wherein:
video signals corresponding to an (r×s) first section of the next portion of the search region are stored in the search area of the computer memory;
the processor compares the video signals of the (r×s) first section to the video signals of the (r×s) reference block;
additional video signals corresponding to the next portion of the search region are stored in the search area of the computer memory; and
the processor compares the video signals of an (r×s) next section of the next portion of the search region to the video signals of the (r×s) reference block, wherein the (r×s) next section comprises the additional video signals.

29. The apparatus of claim 23, wherein on-chip memory of the processor comprises the computer memory.

30. A system for processing video signals, comprising:
(a) an external memory device; and
(b) a processor having on-chip memory, wherein:
video signals corresponding to an (p×q) first portion of a (m×n) search region of a previous frame are transmitted from the external memory device and stored in an (p×q) search area of the on-chip memory, wherein:
p is less than or equal to m; and
q is less than or equal to n;
the processor compares video signals corresponding to an (r×s) reference block of a current image to the video signals in the search area, wherein:
r is less than or equal to p; and
s is less than or equal to q;
video signals corresponding to a next portion of the search region are transmitted from the external memory device and stored in the search area by overwriting a subset of the video signals in the search area, wherein the next portion of the search region is smaller than the first portion of the search region;
the processor compares video signals corresponding to an (r×s) reference block of a current image to the video signals in the search area;
the processor selects a motion vector in accordance with the comparisons.

31. The system of claim 30, wherein the video signals corresponding to the (r×s) reference block of the current image are transmitted from the external memory device and stored in an (r×s) reference area of the on-chip memory.

32. The system of claim 30, wherein the processor encodes the video signals in accordance with the selected motion vector.

33. The system of claim 30, wherein:
video signals corresponding to an (r×s) first section of the first portion of the search region are transmitted from the external memory device and stored in the search area of the on-chip memory;
the processor compares the video signals of the (r×s) first section to the video signals of the (r×s) reference block;
additional video signals corresponding to the first portion of the search region are transmitted from the external memory device and stored in the search area of the on-chip memory; and
the processor compares the video signals of an (r×s) next section of the first portion of the search region to the video signals of the (r×s) reference block, wherein the (r×s) next section comprises the additional video signals.

34. The system of claim 33, wherein:
the video signals corresponding to the (r×s) reference block of the current image are transmitted from the external memory device and stored in an (r×s) reference area of the on-chip memory;
video signals corresponding to an (r×s) first section of the next portion of the search region are transmitted from the external memory device and stored in the search area of the on-chip memory;
the processor compares the video signals of the (r×s) first section to the video signals of the (r×s) reference block;
additional video signals corresponding to the next portion of the search region are transmitted from the external memory device and stored in the search area of the on-chip memory;

the processor compares the video signals of an (r×s) next section of the next portion of the search region to the video signals of the (r×s) reference block, wherein the (r×s) next section comprises the additional video signals; and the processor encodes the video signals in accordance with the selected motion vector.

35. The system of claim 30, wherein:

video signals corresponding to an (r×s) first section of the next portion of the search region are transmitted from the external memory device and stored in the search area of the on-chip memory;

the processor compares the video signals of the (r×s) first section to the video signals of the (r×s) reference block;

additional video signals corresponding to the next portion of the search region are transmitted from the external memory device and stored in the search area of the on-chip memory; and the processor compares the video signals of an (r×s) next section of the next portion of the search region to the video signals of the (r×s) reference block, wherein the (r×s) next section comprises the additional video signals.

* * * * *